(12) United States Patent
Aoyama

(10) Patent No.: US 8,253,763 B2
(45) Date of Patent: Aug. 28, 2012

(54) IMAGE PROCESSING DEVICE AND METHOD, STORAGE MEDIUM, AND PROGRAM

(75) Inventor: Koji Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 1026 days.

(21) Appl. No.: 11/629,316

(22) PCT Filed: Jun. 6, 2005

(86) PCT No.: PCT/JP2005/010351
§ 371 (c)(1),
(2), (4) Date: Oct. 22, 2007

(87) PCT Pub. No.: WO2005/124736
PCT Pub. Date: Dec. 29, 2005

(65) Prior Publication Data
US 2008/0122877 A1    May 29, 2008

(30) Foreign Application Priority Data
Jun. 15, 2004 (JP) .................................. 2004-177123

(51) Int. Cl.
*G09G 5/02* (2006.01)
*G06K 9/32* (2006.01)
(52) U.S. Cl. ........ 345/698; 345/694; 382/298; 382/299; 382/300; 382/301
(58) Field of Classification Search ....... 345/471–472.2, 345/694; 382/173, 176–177, 180, 276, 293–301
See application file for complete search history.

(56) References Cited

U.S. PATENT DOCUMENTS
6,624,825 B1 * 9/2003 Fujiyoshi ...................... 345/698

FOREIGN PATENT DOCUMENTS
| JP | 59 12486 | 1/1984 |
| JP | 61 123872 | 6/1986 |
| JP | 61 208082 | 9/1986 |
| JP | 8 227456 | 9/1996 |

* cited by examiner

*Primary Examiner* — Amr Awad
*Assistant Examiner* — Kenneth Bukowski
(74) *Attorney, Agent, or Firm* — Frommer Lawrence & Haug LLP; William S. Frommer; Thomas F. Presson

(57) ABSTRACT

The present invention relates to an image processing device and method, a storage medium, and a program for performing high-quality enlargement processing. Of input image data, a data buffer 32 holds data of target-pixel neighborhood data necessary for the enlargement processing. A data-position swapping unit 33 swaps the data positions of the target-pixel neighborhood data, as needed. A pixel priority determining unit 34 determines background color or foreground color with respect to each pixel of the target-pixel neighborhood data whose data positions were sapped. A data-selection-flag determining unit 36 determines a data selection flag of the target-pixel neighborhood data, the data selection flag being supplied from the pixel priority determining unit 34. Based on the data selection flag supplied from the data-selection-flag determining unit 36, a data selector 37 selects image data to be fit into the position of the target pixel from the target-pixel neighborhood data supplied from the data-position swapping unit 33. The present invention is applicable to OSD devices.

11 Claims, 42 Drawing Sheets

FIG. 5A
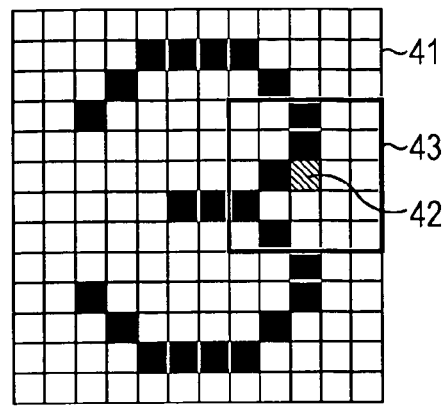
FIG. 5B
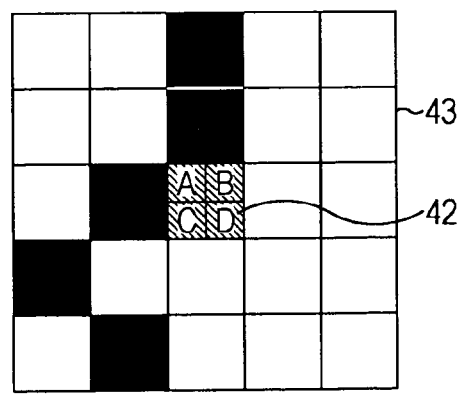
FIG. 5C
| U2L2 | U2L1 | U2C0 | U2R1 | U2R2 |
|------|------|------|------|------|
| U1L2 | U1L1 | U1C0 | U1R1 | U1R2 |
| M0L2 | M0L1 | M0C0 | M0R1 | M0R2 |
| D1L2 | D1L1 | D1C0 | D1R1 | D1R2 |
| D2L2 | D2L1 | D2C0 | D2R1 | D2R2 |

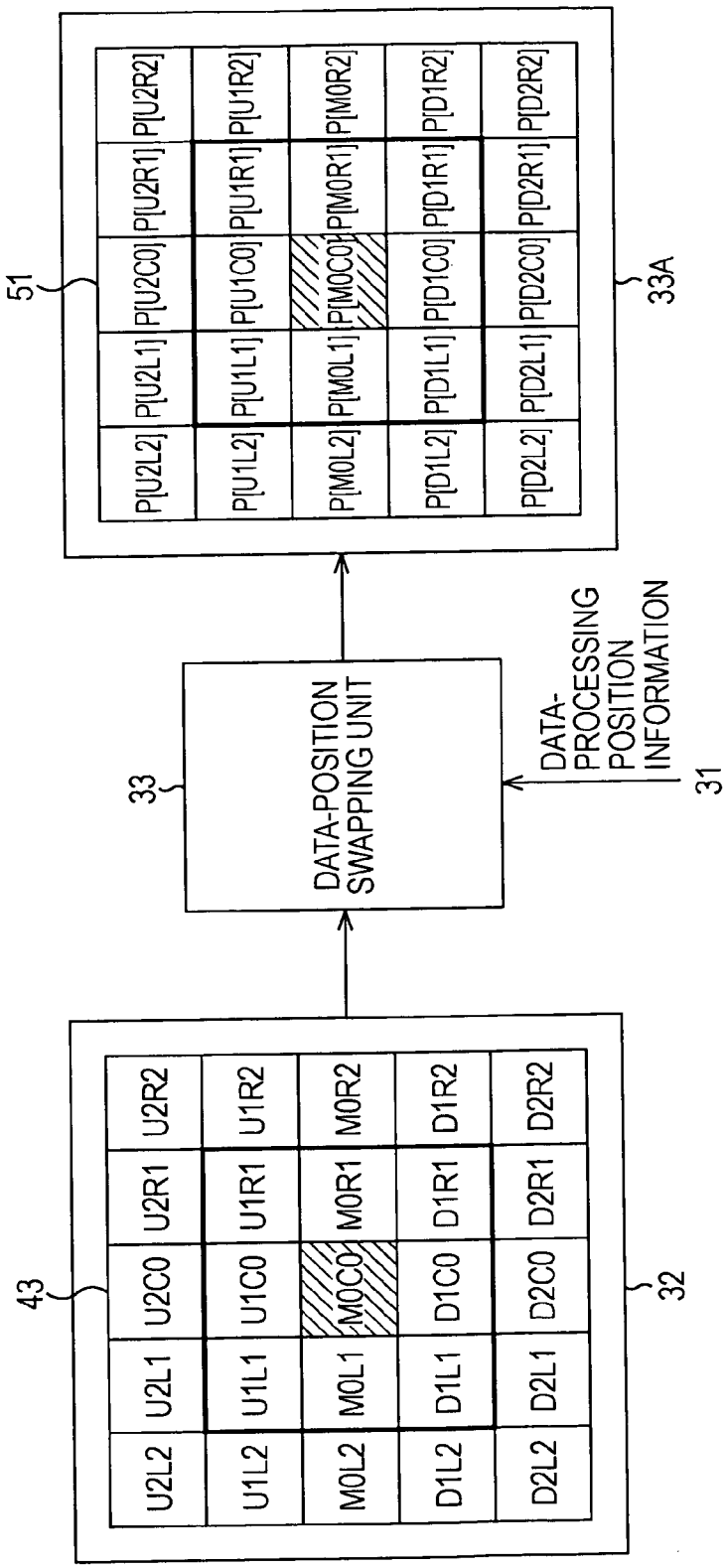

| U2L2 | U2L1 | U2C0 | U2R1 | U2R2 |
|------|------|------|------|------|
| U1L2 | U1L1 | U1C0 | U1R1 | U1R2 |
| M0L2 | M0L1 | M0C0 | M0R1 | M0R2 |
| D1L2 | D1L1 | D1C0 | D1R1 | D1R2 |
| D2L2 | D2L1 | D2C0 | D2R1 | D2R2 |

51

42

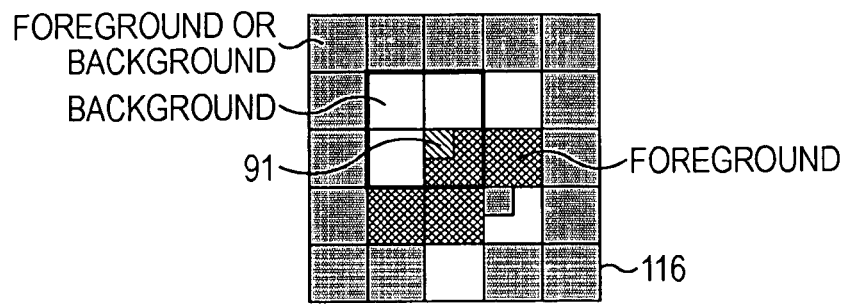
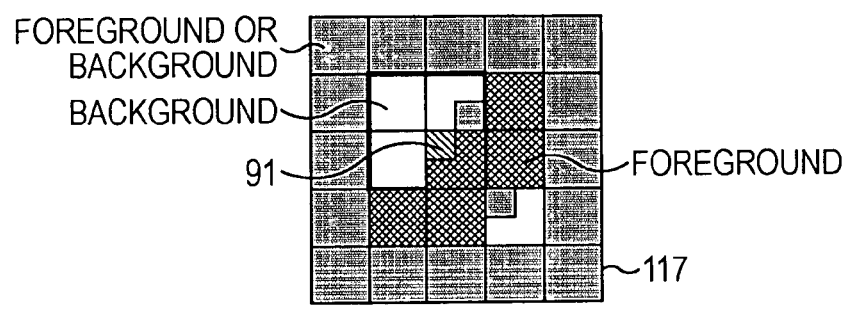
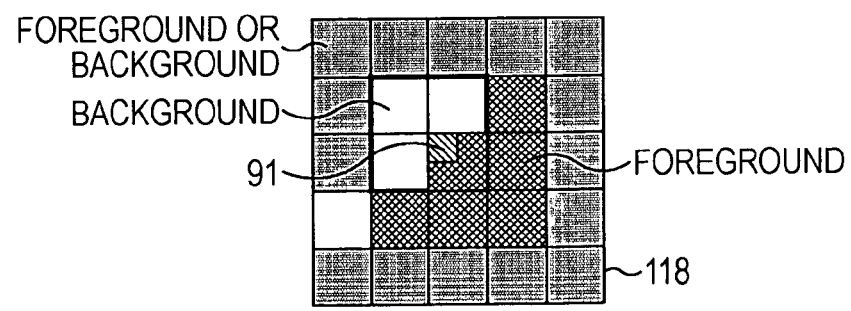
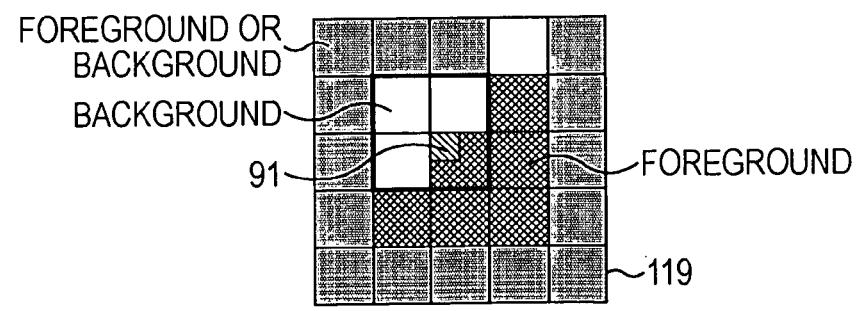

FIG. 36

| OUT | P [M0C0] : IN |
|-----|---------------|
| 0   | ≥             |
| 1   | ≤             |
| 2   | >             |
| 3   | <             |

IMAGE PROCESSING DEVICE AND METHOD, STORAGE MEDIUM, AND PROGRAM

TECHNICAL FIELD

The present invention relates to image processing devices and methods, storage media, and programs. In particular, the present invention relates to an image processing device and method, a storage medium, and a program which allow, for example, characters and images displayed on a display device to be enlarged at low cost and with high quality.

BACKGROUND ART

In recent years, as the resolutions of image display devices such as LCDs (liquid crystal displays) are enhanced, processing for enlarging digital images becomes important.

FIG. 1 shows a configuration example when an enlarging device using nearest-neighbor interpolation is applied to a conventional OSD (on-screen display) device 1.

A microcomputer 11 in the OSD device 1 controls storage of a font ROM (read only memory) 12 and an OSD-plane memory 13 in accordance with a signal (hereinafter referred to as a "user operation signal") that is sent from a user interface 2 and that corresponds to a user operation. The font ROM 12 stores fonts, such as characters, symbols, or graphics to be displayed on a monitor 3. As fonts stored in this case, various typefaces, such as Japanese fonts (i.e., fonts for Japanese) and European fonts (i.e., fonts for alphabets), are available. The OSD-plane memory 13 stores, as OSD display data, fonts read from the font ROM 12 by the microcomputer 11. Further, under the control of the microcomputer 11, the OSD-plane memory 13 supplies the OSD display data to a 2×2 nearest-neighbor interpolator 14. The 2×2 nearest-neighbor interpolator 14 enlarges the OSD display data, supplied from the OSD-plane memory 13, by a factor of 2 in the vertical directions and a factor of 2 in the horizontal directions and supplies the resulting OSD display data to a mixer 15. The mixer 15 combines the OSD display data supplied from the 2×2 nearest-neighbor interpolator 14 and a video signal supplied from a camera processor, not shown, and causes the monitor 3 to display the resulting data.

FIG. 2 is a diagram showing a configuration example when fonts for ordinary display and for enlargement display are stored in the font ROM 12 of the conventional OSD device 1. Units corresponding to those in FIG. 1 are denoted by the same reference numerals and the descriptions thereof are omitted as appropriate.

The font ROM 12 stores fonts for ordinary display and for enlargement display, such as characters, symbols, and graphics to be displayed on the monitor 3. The OSD-plane memory 13 stores, as OSD display data, fonts read from the font ROM 12 by the microcomputer 11. Further, under the control of the microcomputer 11, the OSD-plane memory 13 supplies the OSD display data to the mixer 15. The mixer 15 combines the OSD display data supplied from the OSD-plane memory 13 and a video signal supplied from a camera processor, not shown, and causes the monitor 3 to display the resulting data.

As described above, with the OSD device 1 shown in FIG. 1, although the cost is low, the image quality deteriorates significantly. With the OSD device shown in FIG. 2, although the image quality can be maintained, a large-capacity font ROM 12 and a large-capacity OSD-plane memory 13 are required.

Digitized image can be broadly classified into two groups, namely, natural images captured by image-capture devices, such as digital still cameras, and artificial images, such as graphics and characters generated by computers and so on.

For natural images, interpolation-filter-based enlargement techniques and reduction techniques according to sampling theorems, such as bilinear interpolation and cubic interpolation, are used. These techniques can provide high-quality enlarged images with respect to natural images that have multi-value gradations and that contain noise in principle.

In contrast, when an interpolation-filter-based enlargement technique is used for artificial images, edges of characters and so on are rounded, thus making it impossible to provide high-quality images. In particular, for binary images such as characters and so on, blurring due to edge rounding occurs. Accordingly, in order to prevent the blurring, an enlargement technique using nearest-neighbor interpolation, as shown in FIG. 1, is used for artificial images. With this technique, however, jaggy becomes a problem in a visual sense.

Accordingly, some techniques for performing high-quality enlargement on, of artificial images, image data (e.g., characters and graphics) that has less gradation and that is less susceptible to noise have been proposed.

For example, Patent Document 1 proposes a technique for generating enlarged characters from basic-character font data and correcting the characters. In addition, for example, Patent Document 2 proposes a technique for scaling binary images by using piecewise polynomial interpolation. Additionally, for example, Patent Document 3 proposes a technique for generating fonts by using a genetic algorithm. Also, for example, Patent Document 4 proposes a technique for recognizing a coupling state of surrounding pixels, estimating an optimum contour, and performing re-sampling. In addition, for example, Patent Document 5 proposes a technique for smoothing when characters or graphics are enlarged.

[Patent Document 1] Japanese Unexamined Patent Application Publication No. 5-94171
[Patent Document 2] Japanese Unexamined Patent Application Publication No. 8-63592
[Patent Document 3] Japanese Unexamined Patent Application Publication No. 2004-4302
[Patent Document 4] Japanese Unexamined Patent Application Publication No. 6-68247
[Patent Document 5] Japanese Unexamined Patent Application Publication No. 9-305755

DISCLOSURE OF INVENTION

Problem to be Solved by the Invention

However, the technologies of the patent documents noted above require complicated computational processing, and thus have problems in that the processing time and the cost for configuring the hardware increase.

Either of the technologies is targeted for monochromatic gray-scale images even for binary graphics images or multi-valued images, and thus has a problem in that they cannot deal with multi-valued multi-color graphic images with character decoration, such as outlining and shadow characters.

The present invention has been made in view of such situations, and allows characters and images displayed on a display device to be enlarged at low cost and with high quality.

Means for Solving the Problems

An information processing device of the present invention includes: holding means for holding neighborhood pixels in an image, the neighborhood pixels including a target pixel; dividing means for dividing the target pixel; and discriminating means for discriminating between subject color and background color with respect to each pixel held by the holding means. The image processing device further includes: first-pattern determining means for determining whether or not an arrangement pattern of the subject color and the background color, the arrangement pattern being obtained based on a result of the discrimination performed by the discriminating means, matches a first pattern for expanding the subject color; second-pattern determining means for determining whether or not an arrangement pattern of the subject color and the background color, the arrangement pattern being obtained based on a result of the discrimination performed by the discriminating means, matches a second pattern for expanding the background color; and selecting means for selecting data to be fit into the target pixel, divided by the dividing means, from the neighborhood pixels based on results of the determination performed by the first-pattern and second-pattern determining means.

The information processing device can further include: determining means for determining whether or not to change a pixel distribution of the neighborhood pixels including the target pixel, the neighborhood pixels being held by the holding means; and data swapping means for changing the pixel distribution of the neighborhood pixels including the target pixel, based on a result of the determination performed by the determining means.

The image may be a character, and each of the first and the second patterns may be implemented with a multi-level pattern determined in accordance with a type of the character.

The discriminating means can discriminate between the subject color and the foreground color by comparing the target pixel with the neighborhood pixels.

An information processing method of the present invention includes: a holding step of holding neighborhood pixels in an image, the neighborhood pixels including a target pixel; a dividing step of dividing the target pixel; and a discriminating step of discriminating between subject color and background color with respect to each pixel held in the holding step. The method further includes: a first-pattern determining step of determining whether or not an arrangement pattern of the subject color and the background color, the arrangement pattern being obtained based on a discrimination result obtained by the processing performed in the discriminating step, matches a first pattern for expanding the subject color; a second-pattern determining step of determining whether or not an arrangement pattern of the subject color and the background color, the arrangement pattern being obtained based on a discrimination result obtained in the processing performed by the discriminating step, matches a second pattern for expanding the background color; and a selecting step of selecting data to be fit into the target pixel, divided by the processing performed in the dividing step, from the neighborhood pixels based on determination results obtained by the processing performed in the first-pattern and second-pattern determining steps.

A program recorded in a storage medium of the present invention includes: a holding step of holding neighborhood pixels in an image, the neighborhood pixels including a target pixel; a dividing step of dividing the target pixel; and a discriminating step of discriminating between subject color and background color with respect to each pixel held in the holding step. The program further includes: a first-pattern determining step of determining whether or not an arrangement pattern of the subject color and the background color, the arrangement pattern being obtained based on a discrimination result obtained by the processing performed in the discriminating step, matches a first pattern for expanding the subject color; a second-pattern determining step of determining whether or not an arrangement pattern of the subject color and the background color, the arrangement pattern being obtained based on a discrimination result obtained in the processing performed by the discriminating step, matches a second pattern for expanding the background color; and a selecting step of selecting data to be fit into the target pixel, divided by the processing performed in the dividing step, from the neighborhood pixels based on determination results obtained by the processing performed in the first-pattern and second-pattern determining steps.

A program of the present invention includes: a holding step of holding neighborhood pixels in the image, the neighborhood pixels including a target pixel; a dividing step of dividing the target pixel; and a discriminating step of discriminating between subject color and background color with respect to each pixel held in the holding step. The program further includes: a first-pattern determining step of determining whether or not an arrangement pattern of the subject color and the background color, the arrangement pattern being obtained based on a discrimination result obtained by the processing performed in the discriminating step, matches a first pattern for expanding the subject color; a second-pattern determining step of determining whether or not an arrangement pattern of the subject color and the background color, the arrangement pattern being obtained based on a discrimination result obtained in the processing performed by the discriminating step, matches a second pattern for expanding the background color; and a selecting step of selecting data to be fit into the target pixel, divided by the processing performed in the dividing step, from the neighborhood pixels based on determination results obtained by the processing performed in the first-pattern and second-pattern determining steps.

In the present invention, neighborhood pixels including a target pixel in an image are held, the target pixel is divided, and subject color and background color are discriminated with respect to each held pixel. A determination is made as to whether or not a target-color and background-color arrangement pattern obtained based on a result of the discrimination matches a first pattern for expanding the subject color and an arrangement pattern matches a second pattern for expanding the background color. Based on results of the first and second determinations, data to be fit into the divided target pixel is selected from the neighborhood pixels.

Advantages

According to the present invention, it is possible to enlarge characters, images, and so on displayed on a display device. In particular, it is possible to enlarge characters and images displayed on a display device with a small amount of computation processing, at low cost, and with high quality, without increasing the circuit scale.

BRIEF DESCRIPTION OF THE DRAWINGS

FIG. 5A is a view illustrating data held by a data buffer.

FIG. 5B is a diagram illustrating the data held by the data buffer.

FIG. 5C is a diagram illustrating the data held by the data buffer.

FIG. 6 is a diagram illustrating an overview of a data-position swapping method.

FIG. 17A is a diagram showing another example of the pattern used for the pattern determination.

FIG. 17B is a diagram showing another example of the pattern used for the pattern determination.

FIG. 17C is a diagram showing another example of the pattern used for the pattern determination.

FIG. 17D is a diagram showing another example of the pattern used for the pattern determination.

FIG. 36 is a table showing codes assigned in accordance with a result of comparison of P[M0C0] and IN.

REFERENCE NUMERALS

1 OSD device, 3 monitor, 12 font ROM, 21 image enlarging device, 31 control unit, 32 data buffer, 33 data-position swapping unit, 34 pixel priority determining unit, 35 processing-mode control unit, 36 data-selection-flag determining unit, 37 data selector, 61-1 to 61-25 determining unit, 62-1 to 62-25 LUT, 71 character recognizing unit, 72 wide-character processor, 73 wide-character processor, 201-1 to 201-24 comparator, 202-1 to 202-24, 203-1 to 203-24 LUT, 204-1 to 204-24 size comparator

BEST MODE FOR CARRYING OUT THE INVENTION

An embodiment of the present invention will be described below with reference to the drawings.

Figure 1:
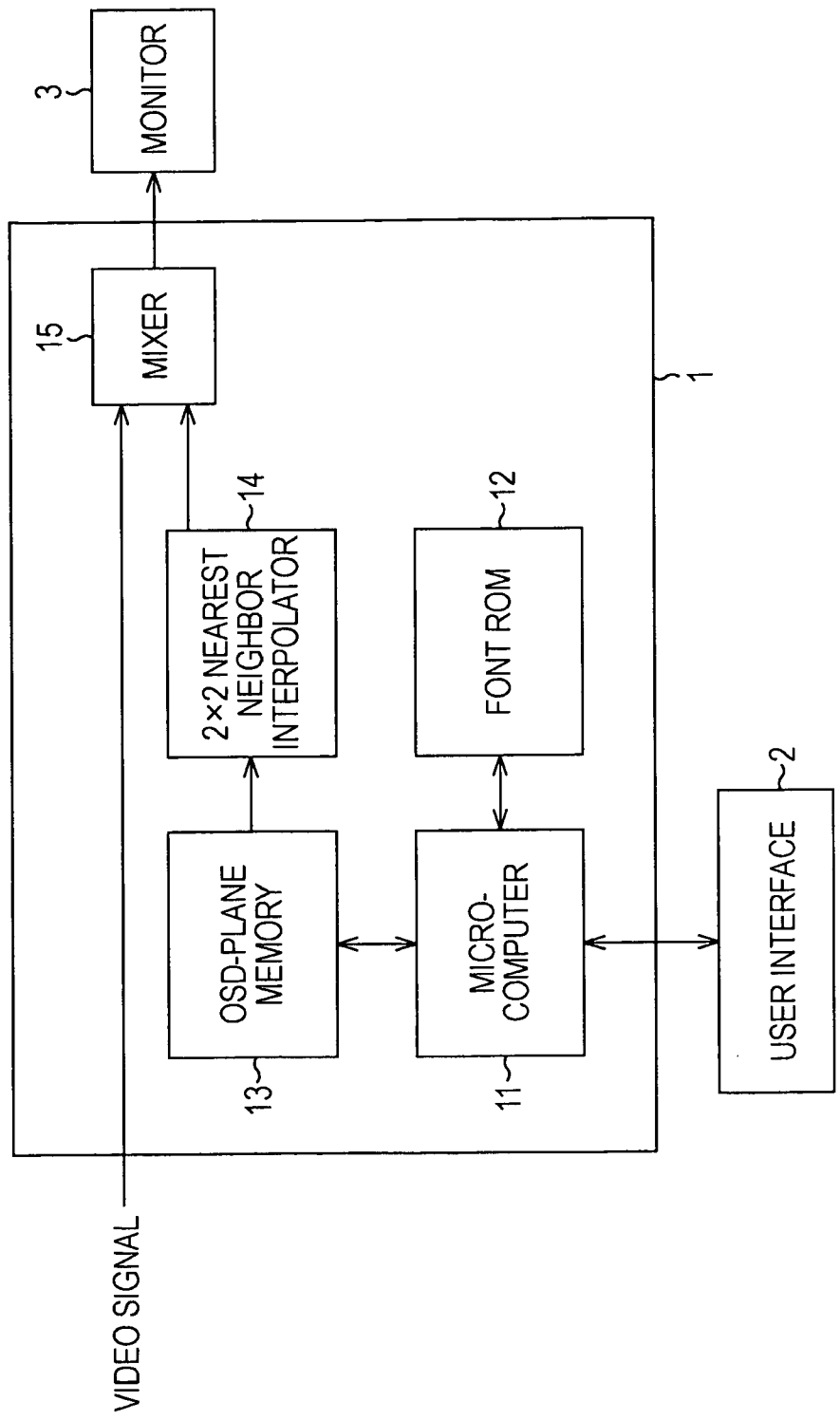
FIG. 1 is a diagram showing a configuration example when an enlarging device using nearest neighbor interpolation is applied to a conventional OSD device.
Figure 2:
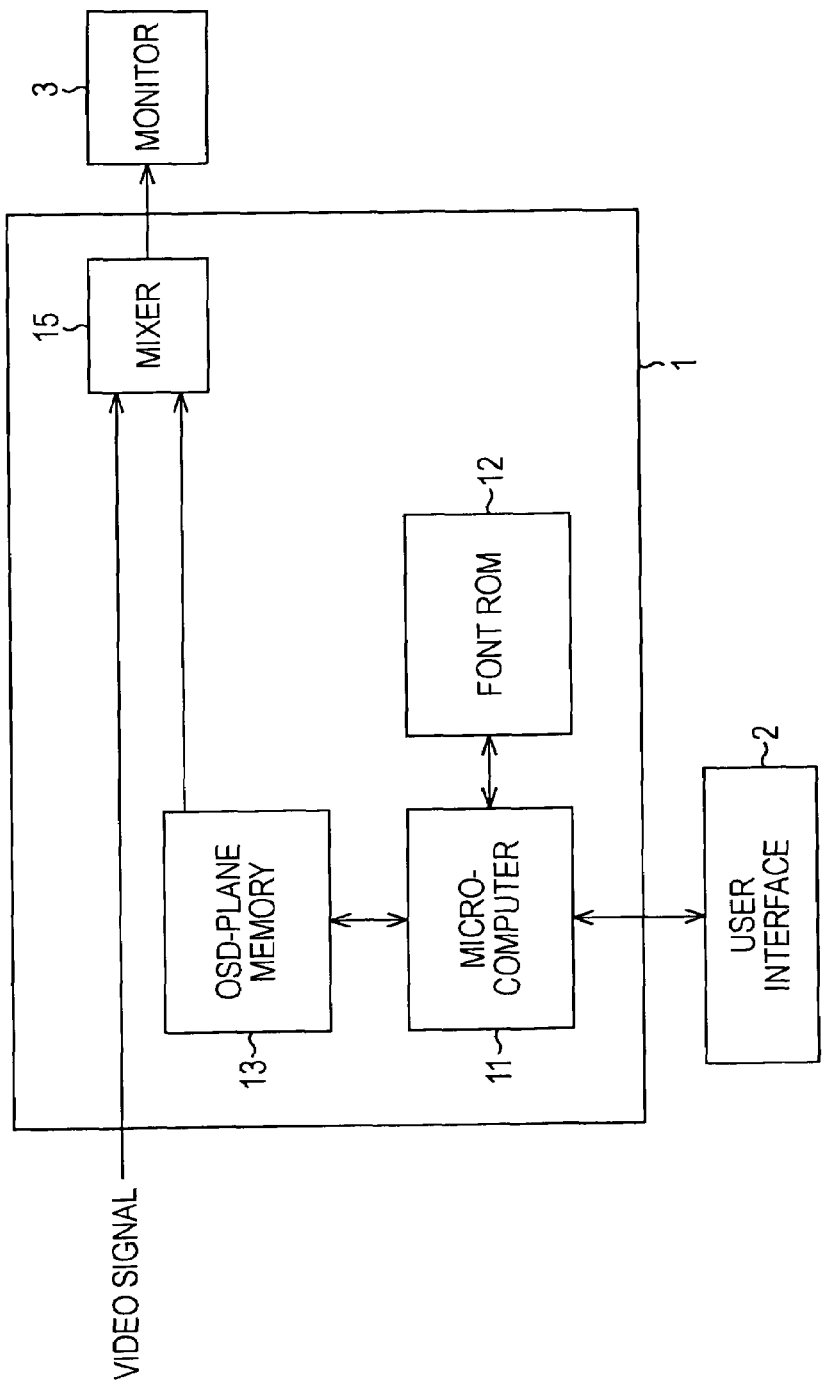
FIG. 2 is a diagram showing a configuration example when fonts for ordinary display and for enlargement display are stored in a font ROM in the conventional OSD device.
Figure 3:
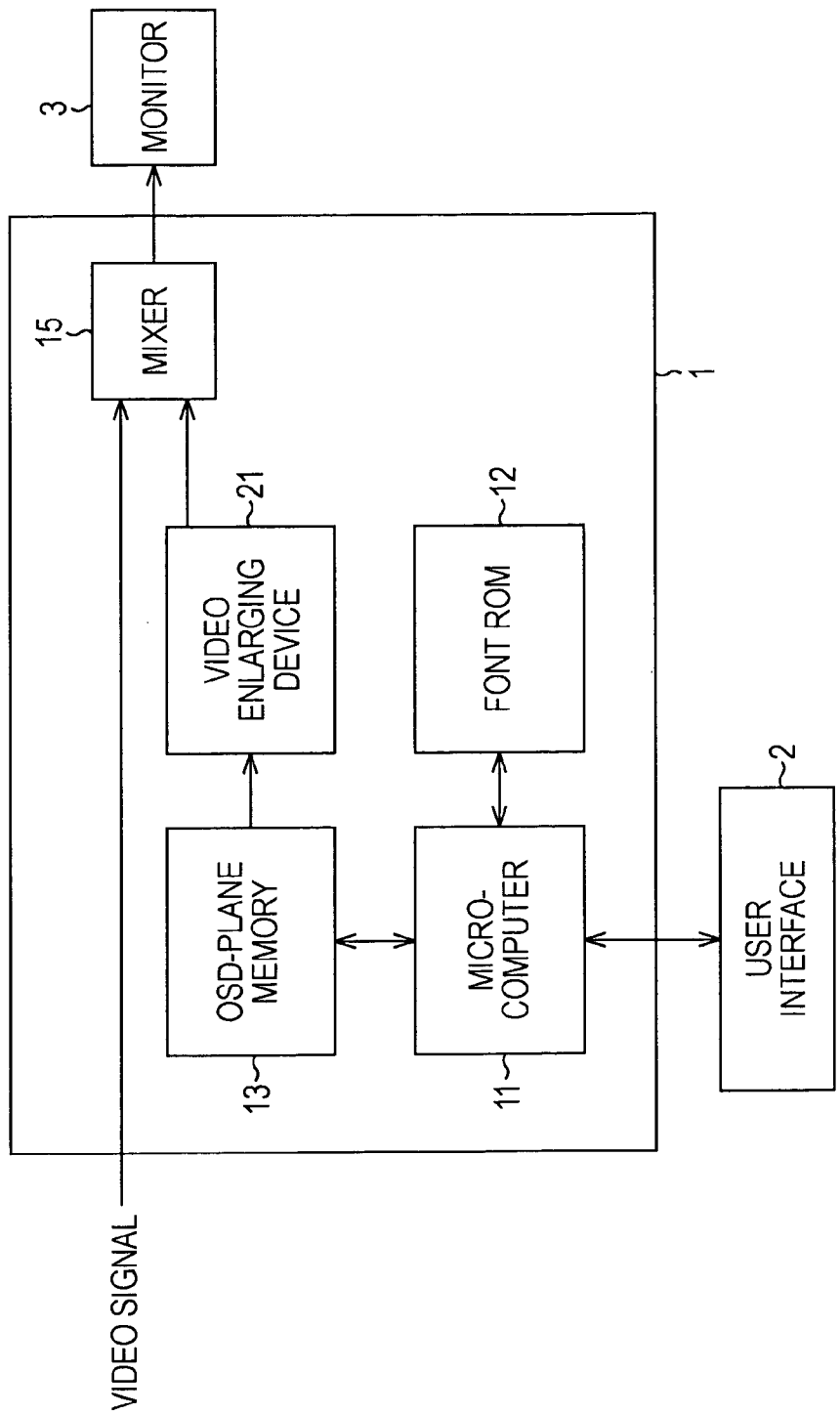
FIG. 3 is a block diagram showing a configuration example of an OSD device according to the present invention.

FIG. 3 is a diagram showing the configuration of an OSD device 1 according to the present invention. Units corresponding to those of the related art are denoted by the same reference numerals and the descriptions thereof are omitted as appropriate.

Under the control of a microcomputer 11, an OSD-plane memory 13 supplies OSD display data to an image enlarging device 21. The image enlarging device 21 enlarges the OSD display data, supplied from the OSD-plane memory 13, by a factor of 2 in the vertical directions and a factor of 2 in the horizontal directions in processing described below and supplies the resulting OSD display data to a mixer 15. The mixer 15 combines the OSD display data supplied from the image enlarging device 21 and a video signal supplied from a camera processor, not shown, and causes a monitor 3 to display the OSD display data.

Figure 4:
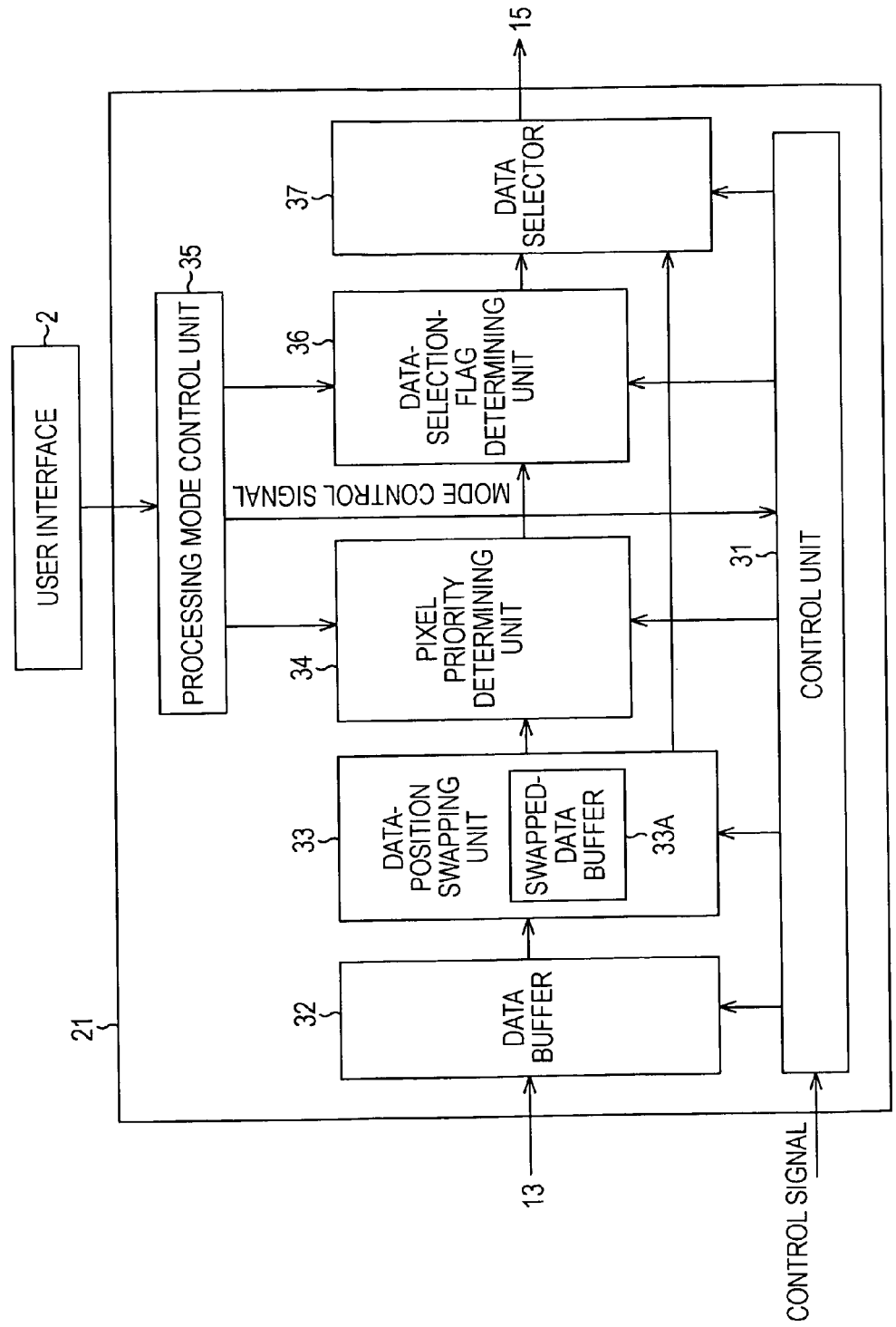
FIG. 4 is a block diagram showing an example of the internal configuration of an image enlarging device.

FIG. 4 is a block diagram showing an example of the internal configuration of the image enlarging device 21.

A control unit 31 controls operations of a data buffer 32, a data-position swapping unit 33, a pixel priority determining unit 34, a data-selection-flag determining unit 36, and a data selector 37, based on a control signal supplied from outside and a mode control signal supplied from a processing-mode control unit 35. Examples of the control signal supplied from outside include a vertical synchronization signal, a horizontal synchronization signal, and a clock, and examples of the mode control signal include a signal having a value indicating a range of an image effective position.

The data buffer 32 includes a line memory, a data delay register, and so on. Of input data (a digitized image signal) supplied from the OSD-plane memory 13, the data buffer 32 holds data of neighborhoods of a target pixel for each pixel, in synchronization with a horizontal synchronization signal and a clock supplied from the control unit 3. The target-pixel neighborhood data is required for enlargement processing. The input data may be supplied to the data buffer 32 in a raster sequence or may be obtained by the data buffer 32 through random access. Details of the data held by the data buffer 32 will be described below with reference to FIG. 5.

Under the control of the control unit 31, the data-position swapping unit 33 swaps the data positions of the target-pixel neighborhood data supplied from the data buffer 32, stores the data whose data positions were swapped in a swapped-data buffer 33A, and supplies the data to the pixel priority determining unit 34 and the data selector 37. Details of a method for data-position swapping performed by the data-position swapping unit 33 will be described later with reference to FIGS. 6 to 10.

With respect to each pixel of the target-pixel neighborhood data whose data positions were swapped and which was supplied from the data-position swapping unit 33, the pixel priority determining unit 34 determines whether or not it has background color or foreground color (subject color). Details of the pixel priority determining unit 34 are described later with reference to FIG. 11.

Based on a user operation signal supplied from a user interface 2, the processing-mode control unit 35 changes background determination information (information for uniquely identifying background color) and foreground determination information (information for uniquely determining background color) and supplies the information to the pixel priority determining unit 34, or changes processing selection information (information on whether or not to perform wide character processing or narrow character processing or information on whether or not to perform background color expansion processing or foreground color expansion processing) and supplies the information to the data-selection-flag determining unit 36. However, needless to say, there is no need to change the information when the processing content is fixed.

Based on the processing selection information supplied from the processing-mode control unit 35, the data-selection-flag determining unit 36 determines a data selection flag for the target-pixel neighborhood data, the data selection flag being a determination result supplied from the pixel priority determining unit 34. Details of the data-selection-flag determining unit 36 are described later with reference to FIGS. 12 to 21.

Based on the data selection flag, which is a determination result supplied from the data-selection-flag determining unit 36, the data selector 37 selects image data to be fit into the position of the target pixel from the target-pixel neighborhood data supplied from the data-position swapping unit 33 and outputs the selected image data to the mixer 15 as output data.

FIGS. 5A to 5C are diagrams illustrating data held by the data buffer 32.

FIG. 5A shows a digitized image 41 input to the data buffer 32. In this image 41, pixels having pixel values 0 (background color) are expressed by white and pixels having pixel values 1 (foreground color) are expressed by black to express a character "3". FIG. 5B is an enlarged view showing a region 43 having its center at a point of interest (a target pixel) 42 in the image 41 and consisting of 5 high×5 wide pixels in the neighborhood of the pixel 42. In the present embodiment, the target point 42 is divided into four areas (A to D in the example of FIG. 5B) to thereby perform enlargement processing with a vertical magnification factor of 2 and a horizontal magnification factor of 2.

FIG. 5C schematically shows a state in which, in accordance with positional relationships relative to the target point 42, symbols are sequentially assigned to the pixels of the data of the region 43 to which a reference is made for enlargement processing. The second upper pixels from the pixel "M0C0" of the target point 42 are given symbols "U2", the first upper pixels are given "U1", the pixels in the same horizontal directions are given "M0", the first lower pixels are given "D1", and the second lower pixels are given "D2". The second left pixels from the pixel "M0C0" of the target point 42 are given symbols "L2", the first left pixels are given "L1", the pixels in the same vertical directions are given "C0", the first right pixels are "R1", and the second right pixels are given "R2".

With this arrangement, the pixel values of positions relative to the target point 42 can be expressed. Although a description in the present embodiment will be given of a case in which the data of the region 43 consisting of 5 high×5 wide pixels is referred to, the present invention is not limited thereto. For example, a reference may be made to data of a region consisting of, for example, 3 high×3 wide pixels, 7 high×7 wide pixels, or more pixels.

FIG. 6 is a diagram illustrating an overview of a method for the data-position swapping performed by the data-position swapping unit 33.

Based on data-processing position information supplied from the control unit 31, the data-position swapping unit 33 swaps the data positions of the data of the region 43 consisting of the 5 high×5 wide pixels which is output from the data buffer 32 and stores, in the swapped-data buffer 33A, the data of a region 51 consisting of the 5 high×5 wide pixels whose data positions were swapped. As shown in the figure, each pixel value of the data stored in the swapped-data buffer 33A is expressed by P[X]. X in this case indicates a position relative to the target point 42.

Next, details of a method for data-position swapping performed by the data-position swapping unit 33 will be described with reference to FIGS. 7 to 10. The uppermost row in the region 43 consisting of the 5 high×5 wide pixels, the next row, . . . , the lowermost row, the leftmost column, the next column, . . . , and the rightmost column are referred to as a first row, a second row, . . . , a fifth row, a first column, a second column, . . . , and a fifth column, respectively.

First, the control unit 31 forms a processing loop corresponding to an input pixel size. By forming an enlargement loop for increasing the number of pixels by a factor of 2 in the vertical directions and a factor of 2 in the horizontal directions, the control unit 31 divides the target point 42 into four sections as shown in FIG. 5B. Of the 2 high×2 wide pixels, the control unit 31 then supplies data-processing position information to the data-position swapping unit 33. The data-processing position information indicates which position's data is to be subjected to data processing.

Figures 7A, 7B:
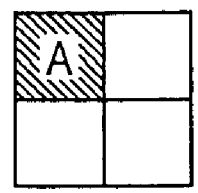
FIG. 7A is a diagram illustrating details of the data-position swapping method.
FIG. 7B is a diagram illustrating details of the data-position swapping method.

When the data-processing position information supplied from the control unit 31 indicates the position A (reference), as shown in FIG. 7A, the data-position swapping unit 33 stores the data of the region 43 in the swapped-data buffer 33A without swapping the data positions of the data of the region 43, as shown in FIG. 7B. As a result of the storage of the data of the region 43 in the swapped-data buffer 33A without the data positions thereof being swapped, the region 43 is handled as a new region 51 consisting of 5 high×5 wide pixels.

Figure 8A:
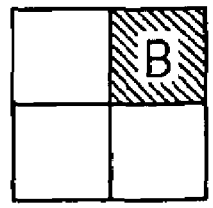
FIG. 8A is another diagram illustrating details of the data-position swapping method.
Figure 8B:
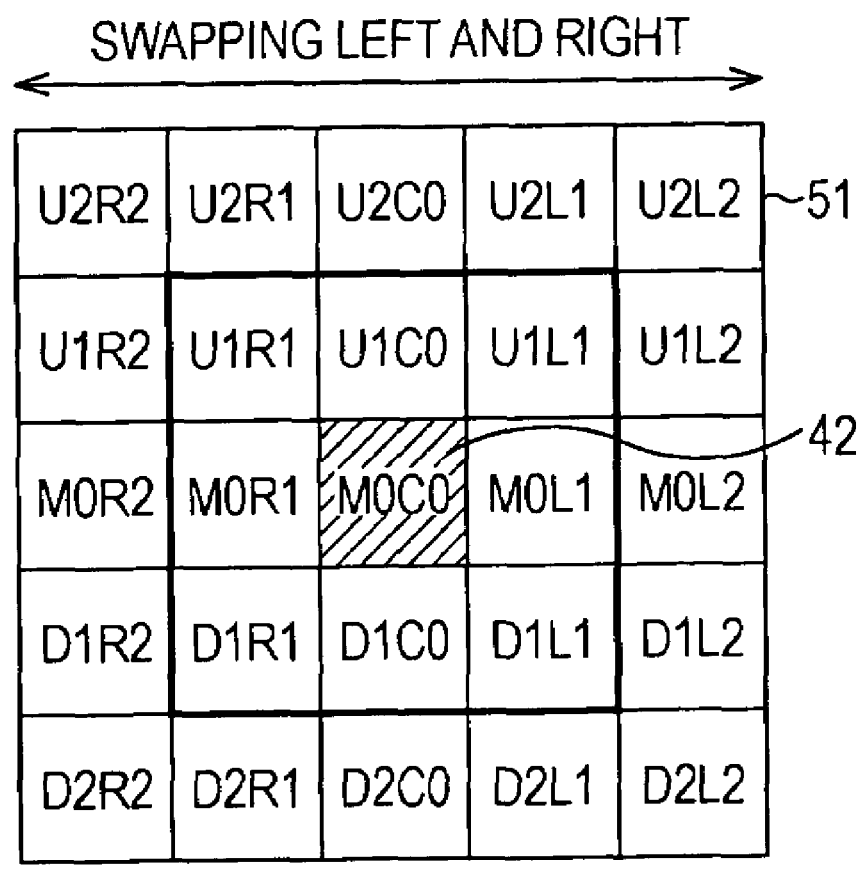
FIG. 8B is another diagram illustrating details of the data-position swapping method.

When the data-processing position information supplied from the control unit 31 indicates the position B, as shown in FIG. 8A, the data-position swapping unit 33 swaps the data positions of the data of the region 43 left and right (i.e., in the horizontal directions), as shown in FIG. 8B. As a result, for example, the order of pixels "U2L2, "U2L1", "U2C0", "U2R1", and "U2R2" arranged sequentially from the left in the first row in the region 43 is changed to the order of pixels "U2R2", "U2R1", "U2C0", "U2L1", and "U2L2". Similarly, data positions in the second to fifth rows are swapped left and right. The data of the new region 51 whose data positions were swapped as described above and which consists of the 5 high×5 wide pixels is stored in the swapped-data buffer 33A.

Figure 9A:
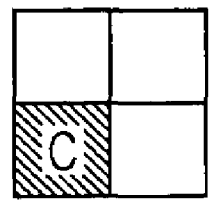
FIG. 9A is another diagram illustrating details of the data-position swapping method.
Figure 9B:
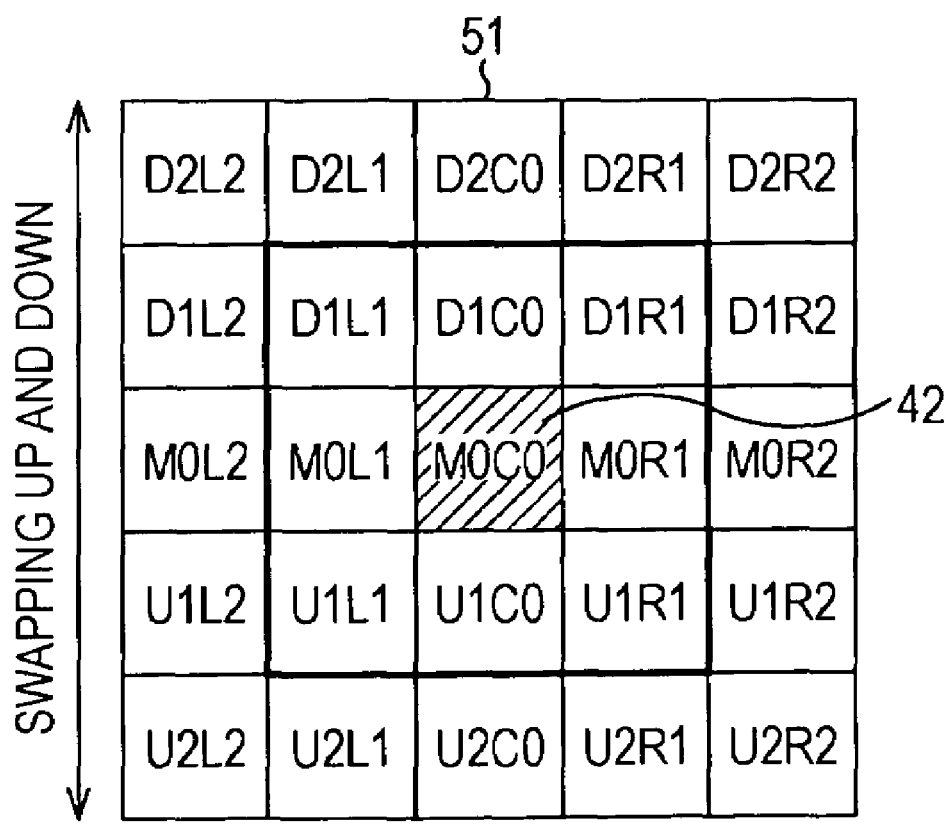
FIG. 9B is another diagram illustrating details of the data-position swapping method.

When the data-processing position information supplied from the control unit 31 indicates the position C, as shown in FIG. 9A, the data-position swapping unit 33 swaps the data positions of the data of the region 43 up and down (i.e., in the vertical directions), as shown in FIG. 9B. As a result, for example, the order of the pixels "U2L2, "U1L2", "M0L2", "D1L2", and "D2L2" arranged sequentially from the top in the first column in the region 43 is changed to the order of the pixels "D2L2", "D1L2", "M0L2", "U1L2", and "U2L2". Similarly, data positions in the second to fifth columns are swapped up and down. The data of the new region 51 whose data positions were swapped as described above and which consists of the 5 high×5 wide pixels is stored in the swapped-data buffer 33A.

Figure 10A:
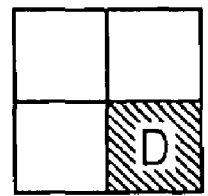
FIG. 10A is another diagram illustrating details of the data-position swapping method.
Figure 10B:
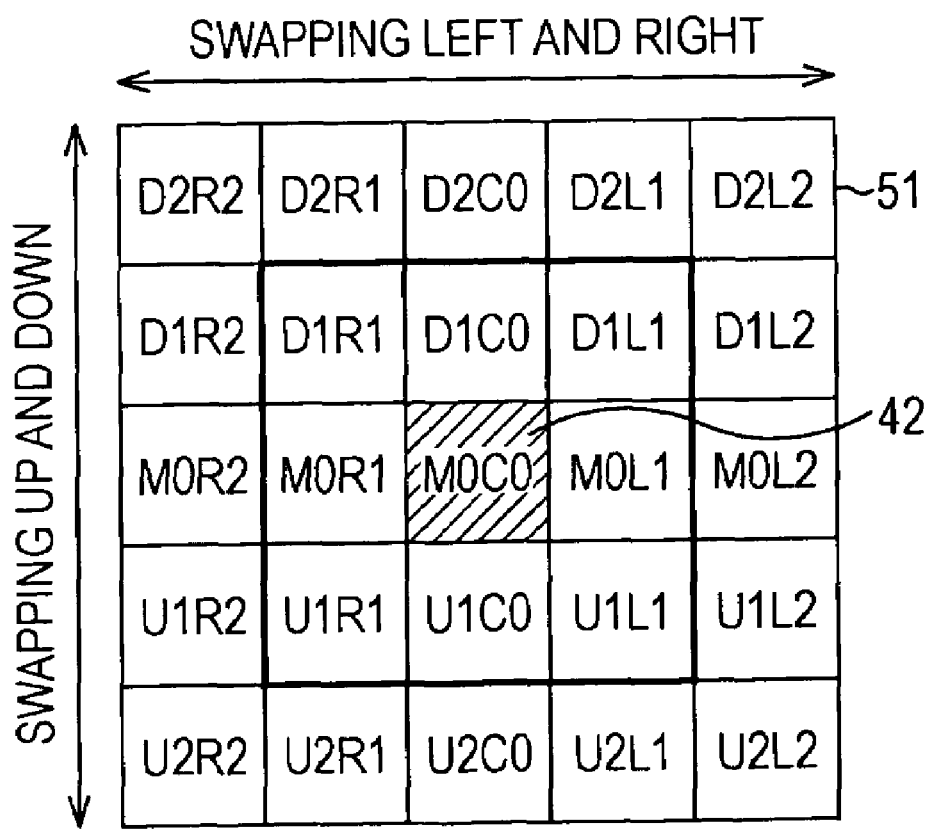
FIG. 10B is another diagram illustrating details of the data-position swapping method.

When the data-processing position information supplied from the control unit 31 indicates the position D, as shown in FIG. 10A, the data-position swapping unit 33 swaps the data positions of the data of the region 43 left and right and up and down (i.e., in the horizontal directions and vertical directions), as shown in FIG. 10B. As a result, for example, the order of the pixels "U2L2, "U2L1", "U2C0", "U2R1", and "U2R2" arranged sequentially from the left in the first row in the region 43 is changed to the order of the pixels "D2R2", "D2R1", "D2C0", "D2L1", and "D2L2,". Similarly, the data positions in the second to fifth rows are swapped left and right and the data positions in the second to fifth columns are swapped up and down. The data of the new region 51 whose data positions were swapped as described above and which consists of the 5 high×5 wide pixels is stored in the swapped-data buffer 33A.

As described above, since the data-position swapping unit 33 swaps the data positions during the processing for enlarging the target point 42 by a factor of 2 in the vertical directions and a factor of 2 in the horizontal directions, the subsequent stages (i.e., stages subsequent to the pixel priority determining unit 34) can process the data, as processing for the position A (FIG. 7A), regardless of the data processing position. As a result, it is possible to reduce the number of patterns determined in pattern determination described below and is possible to reduce the computational cost to one fourth.

Figure 11:
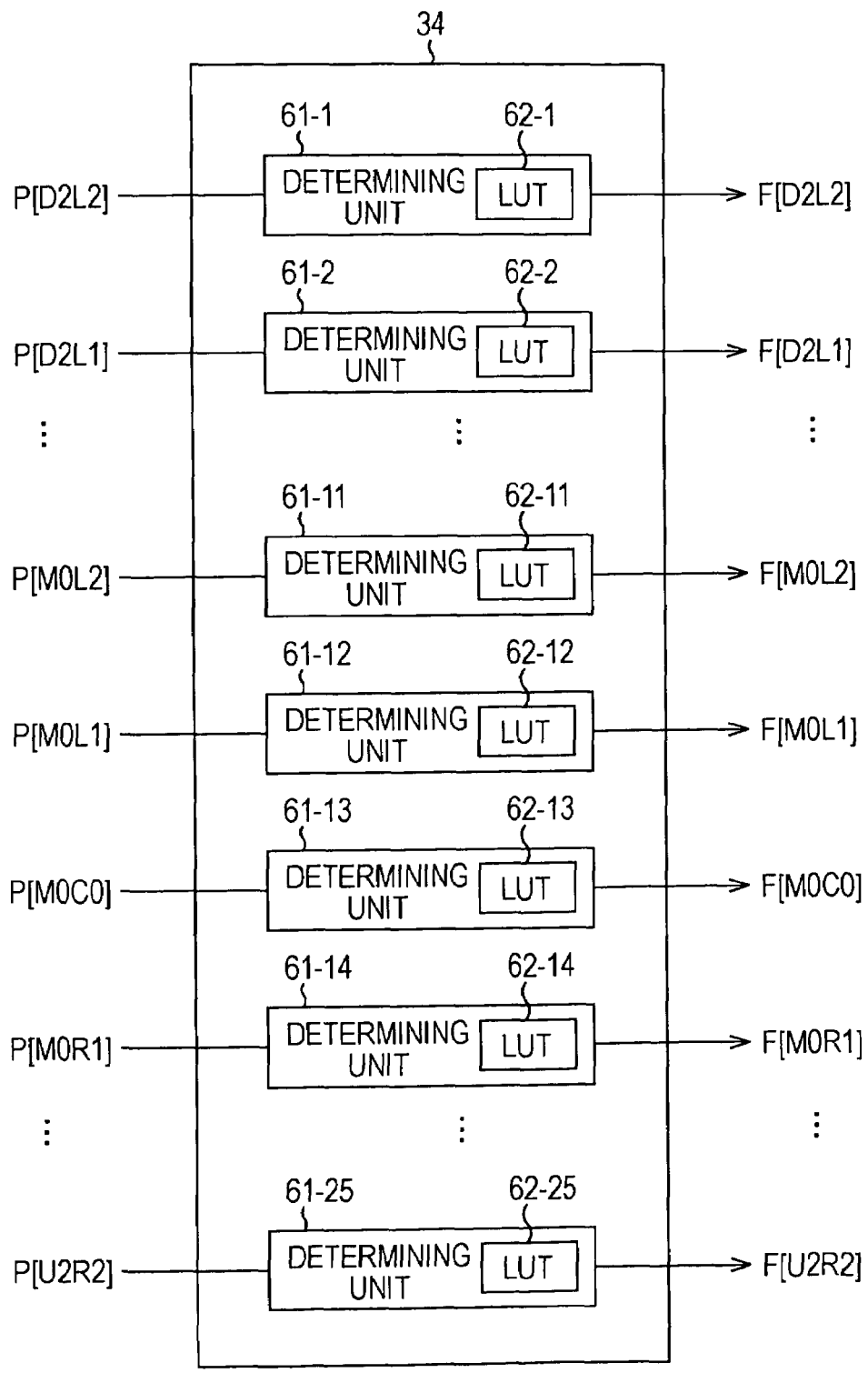
FIG. 11 is a block diagram showing an example of a detailed configuration of a pixel priority determining unit.

FIG. 11 is a block diagram showing an example of a detailed configuration of the pixel priority determining unit 34.

As shown in the figure, the pixel priority determining unit 34 includes determining units 61-1 to 61-25. The determining units 61-1 to 61-25 have LUTs (lookup tables) 62-1 to 62-25, respectively. For example, in the LUTs 62-1 and 62-25, a pixel value 0 (white) is set for background color and a pixel value 1 (black) is set for foreground color, based on the background determination information and the foreground determination information supplied from the processing-mode control unit 35.

Of the data of the region 51 (FIG. 6) consisting of the 5 high×5 wide pixels which is supplied from the data-position swapping unit 33, the determining unit 61-1 inputs the data of the pixel P[D2L2] and determines whether or not the pixel value thereof indicates background color or foreground color based on the LUT 62-1. Similarly, of the data of the region 51 consisting of the 5 high×5 wide pixels which is supplied from the data-position swapping unit 33, the determining units 61-2 to 61-25 input the data of the pixels P[D2L1] to P[U2R2], respectively, and determines whether or not the pixel values thereof indicate background color or foreground color based on the LUTs 62-2 to 62-25.

The determining units 61-1 to 61-25 output respective determination results in the form of F[X] to the data-selection-flag determining unit 36. X in this case indicates a position relative to the target point 42.

Figure 12:
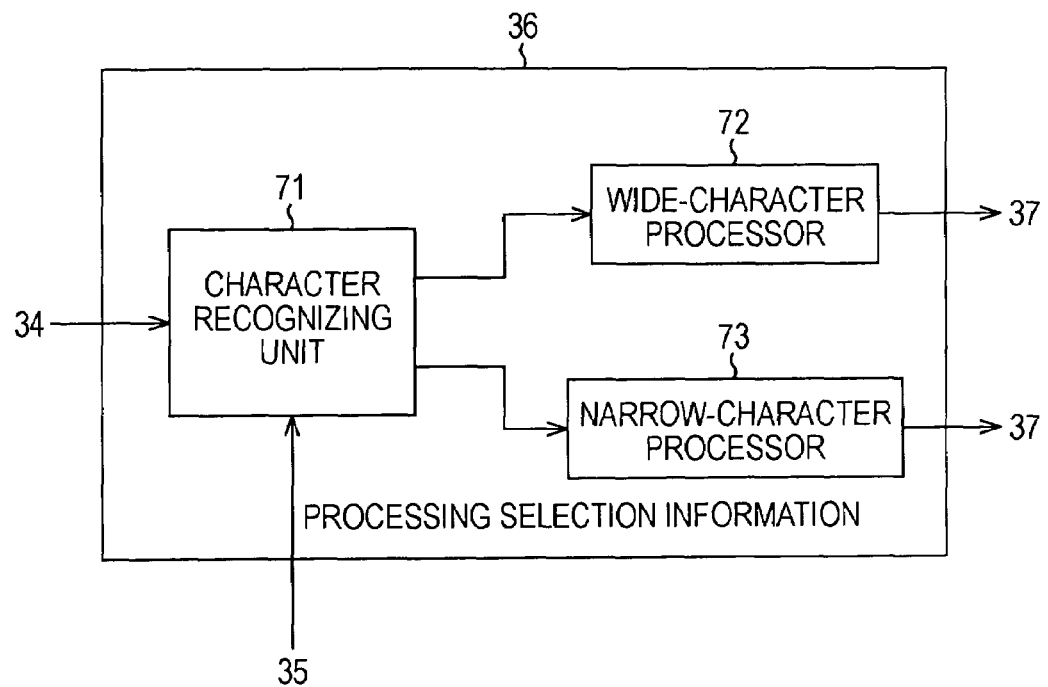
FIG. 12 is a block diagram showing an example of a detailed configuration of a data-selection-flag determining unit.

FIG. 12 is a block diagram showing an example of a detailed configuration of the data-selection-flag determining unit 36.

A character recognizing unit 71 recognizes whether a character to be subjected to the enlargement processing is a wide character or a narrow character, based on the processing selection information supplied from the processing-mode control unit 35. The "wide character" herein refers to a highlighted character or a bold font formed of a line or lines having a two-pixel width or more, and the "narrow character" refers to a character formed of a line or lines having a one-pixel width. When it is recognized that a character to be subjected to the enlargement processing is a wide character, the data of the region 51 consisting of the 5 high×5 wide pixels, the data being a determination result supplied from the pixel priority determining unit 34, is supplied to a wide-character processor 72. When it is recognized that a character to be subjected to the enlargement processing is a narrow character, the data of the region 51 consisting of the 5 high×5 wide pixels, the data being a determination result supplied from the pixel priority determining unit 34, is supplied to a narrow-character processor 73.

Figure 13A:
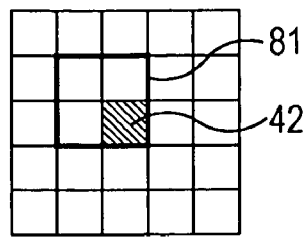
FIG. 13A is a diagram showing an example of a pattern used for pattern determination.
Figure 13B:
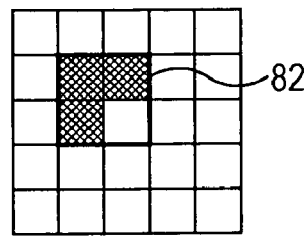
FIG. 13B is a diagram showing an example of the pattern used for the pattern determination.
Figure 13C:
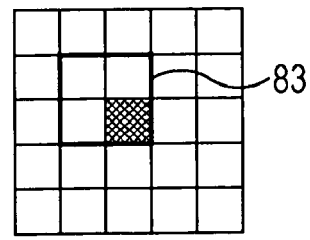
FIG. 13C is a diagram showing an example of the pattern used for the pattern determination.

Of the supplied data of the region 51 consisting of the 5 high×5 wide pixels, the wide-character processor 72 determines whether or not the data of a region 81 consisting of 2 high×2 wide pixels, which consist of the target point 42, the first upper pixel from the target point 42, the first upper left pixel located diagonally from the target point 42, and the first left pixel from the target point 42, as shown in FIG. 13A, matches a pattern 82 shown in FIG. 13B and a pattern 83 shown in FIG. 13C. Based on the result of the determination, the wide-character processor 72 further determines whether or not the data of the region 51 consisting of the 5 high×5 wide pixels matches each pattern shown in FIGS. 14 to 19. Based on the result of the determination, the wide-character processor 72 sets a data selection flag (details thereof will be described below). The data selection flag during initialization, however, is set to 0.

Figure 13D:
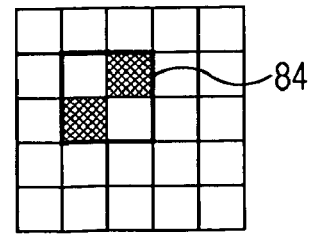
FIG. 13D is a diagram showing an example of the pattern used for the pattern determination.
Figure 13E:
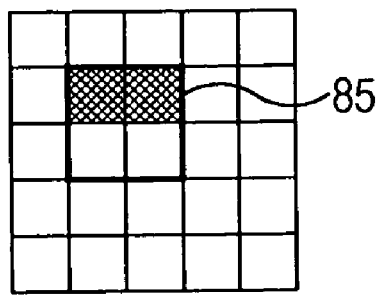
FIG. 13E is a diagram showing an example of the pattern used for the pattern determination.
Figure 13F:
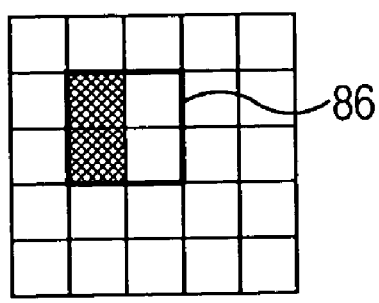
FIG. 13F is a diagram showing an example of the pattern used for the pattern determination.
Figure 13G:
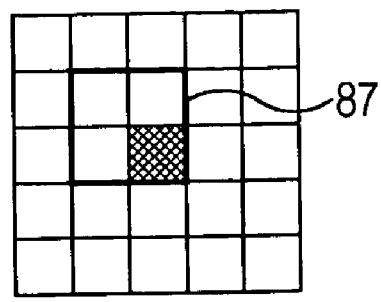
FIG. 13G is a diagram showing an example of the pattern used for the pattern determination.

Of the supplied data of the region 51 consisting of the 5 high×5 wide pixels, the narrow-character processor 73 determines whether or not the data of the region 81 consisting of the 2 high×2 wide pixels, as shown in FIG. 13A, matches a pattern 84 shown in FIG. 13D, a pattern 85 shown in FIG. 13E, a pattern 86 shown in FIG. 13F, and a pattern 87 shown in FIG. 13G. Based on the result of the determination, the narrow-character processor 73 further determines whether or not the data of the region 51 consisting of the 5 high×5 wide pixels matches each pattern shown in FIGS. 20 and 21. Based on the result of the determination, the narrow-character processor 73 sets a data selection flag (details thereof will be described below). The data selection flag during initialization, however, is set to 0.

In FIGS. 13A to 13G, the pixels having foreground color (pixel value 1) are expressed by black and pixels having background color (pixel value 0) are expressed by white.

As shown in FIG. 12, in accordance with characteristics of characters in the input image, the characters are classified into "wide characters" and a "narrow characters" and are subjected to corresponding processing. This makes it possible to perform enlargement processing that makes use of a character feature.

Next, details of pattern determination performed by the wide-character processor 72 and the narrow-character processor 73 will be described with reference to FIGS. 14 to 21. In FIGS. 14 to 21, a point 91 enlarged in the target point 42 is expressed with a diagonal line pattern, pixels having foreground color are expressed with a geometric pattern, pixels having background color are expressed in white, and pixels that may have foreground or background color (pixels that are ignored in the pattern determination) are expressed in gray.

Figure 14A:
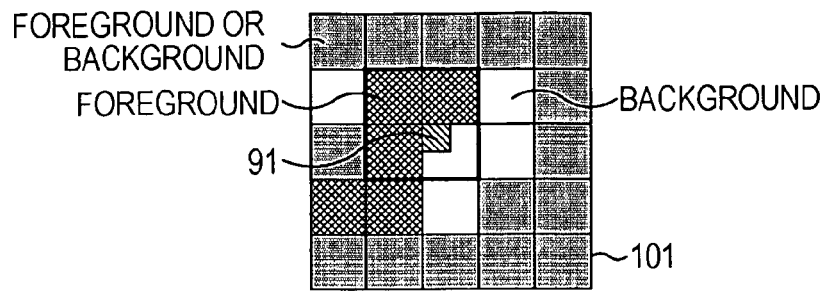
FIG. 14A is a diagram showing another example of a pattern used for pattern determination.
Figure 14B:
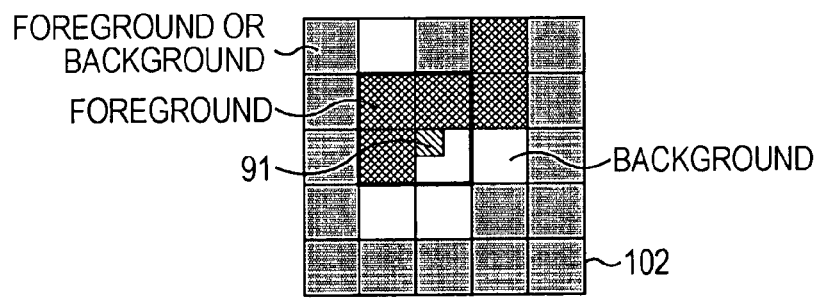
FIG. 14B is a diagram showing another example of the pattern used for the pattern determination.
Figure 14C:
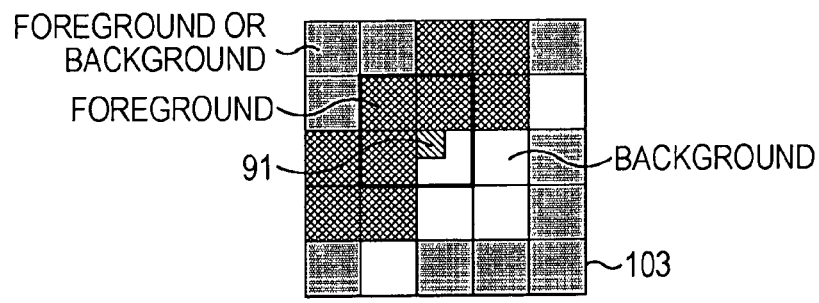
FIG. 14C is a diagram showing another example of the pattern used for the pattern determination.
Figure 14D:
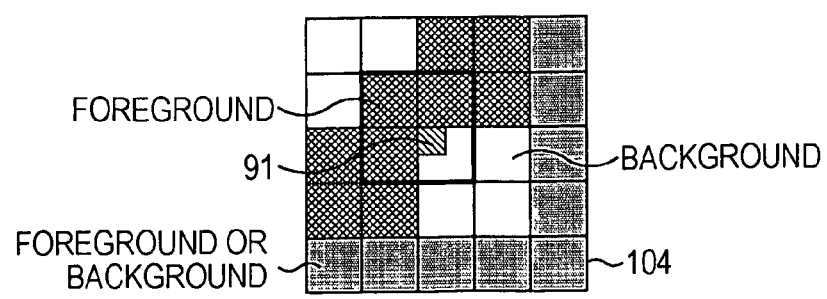
FIG. 14D is a diagram showing another example of the pattern used for the pattern determination.
Figure 15A:
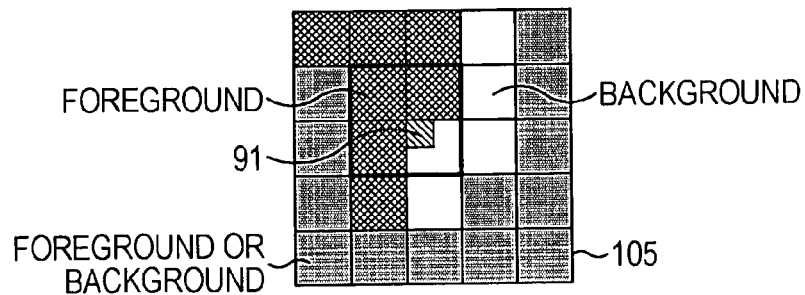
FIG. 15A is a diagram showing another example of the pattern used for the pattern determination.
Figure 15B:
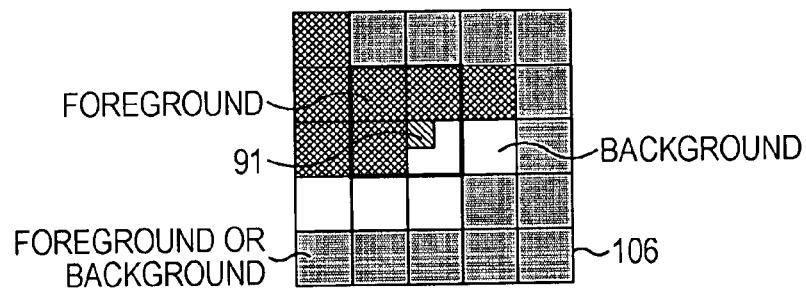
FIG. 15B is a diagram showing another example of the pattern used for the pattern determination.
Figure 15C:
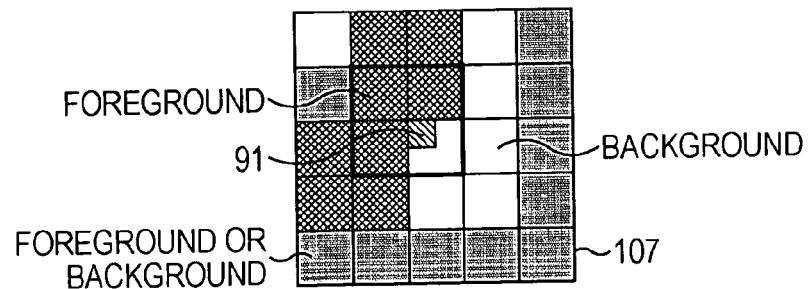
FIG. 15C is a diagram showing another example of the pattern used for the pattern determination.
Figure 15D:
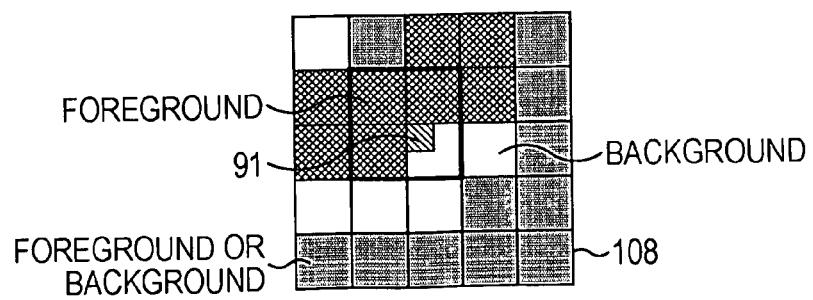
FIG. 15D is a diagram showing another example of the pattern used for the pattern determination.

Upon determining that the data of the region 81 (FIG. 13A) matches the pattern 82 (FIG. 13B), the wide-character processor 72 determines whether or not the data of the region 51 consisting of the 5 high×5 wide pixels matches a pattern 101 shown in FIG. 14A, a pattern 102 shown in FIG. 14B, a pattern 103 shown in FIG. 14C, a pattern 104 shown in FIG. 14D, a pattern 105 shown in FIG. 15A, a pattern 106 shown in FIG. 15B, a pattern 107 shown in FIG. 15C, and a pattern 108 shown in FIG. 15D. As a result of the determination, when it matches even one of the eight patterns 101 to 108, the wide-character processor 72 sets "1" for the data selection flag.

Figure 16A:
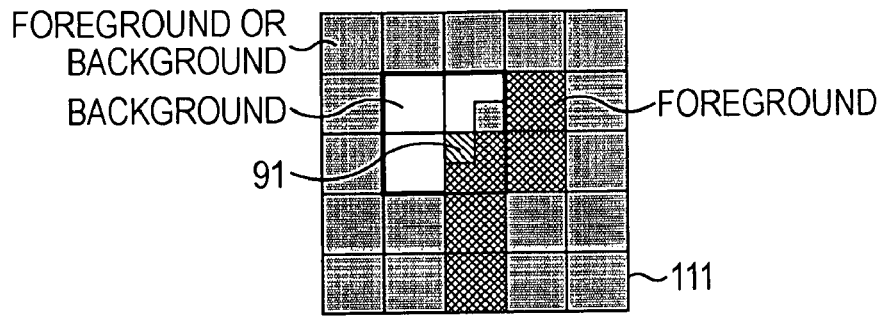
FIG. 16A is a diagram showing another example of the pattern used for the pattern determination.
Figure 16B:
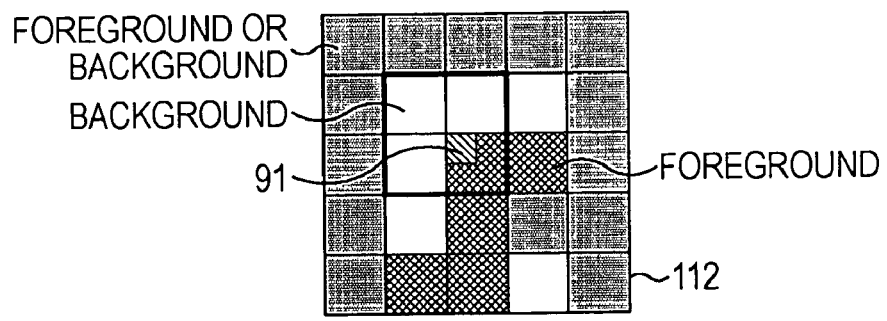
FIG. 16B is a diagram showing another example of the pattern used for the pattern determination.
Figure 16C:
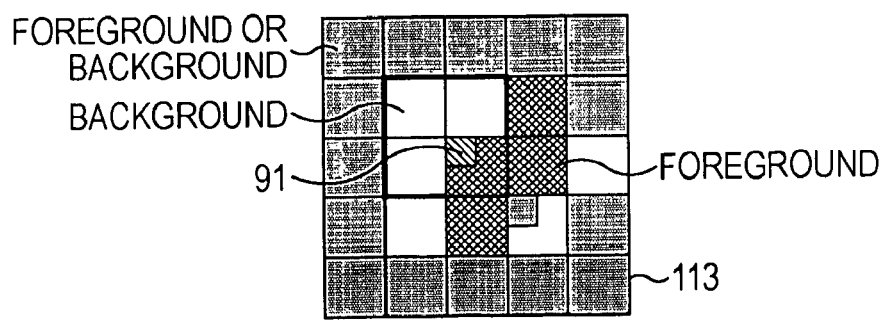
FIG. 16C is a diagram showing another example of the pattern used for the pattern determination.
Figure 16D:
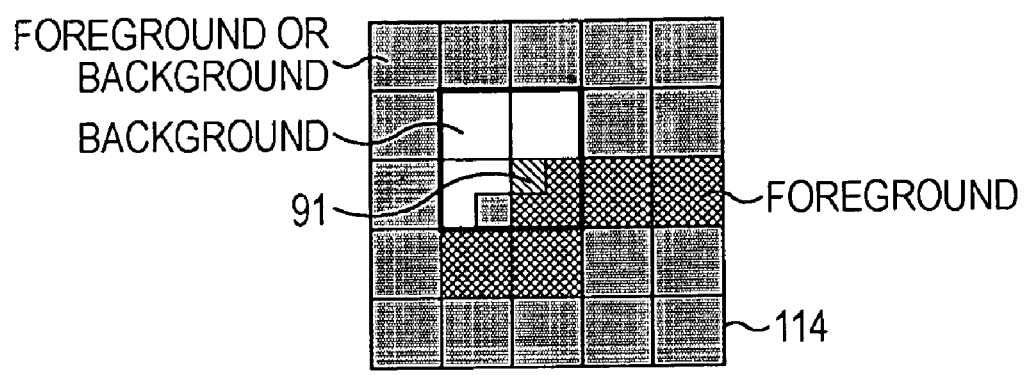
FIG. 16D is a diagram showing another example of the pattern used for the pattern determination.
Figure 16E:
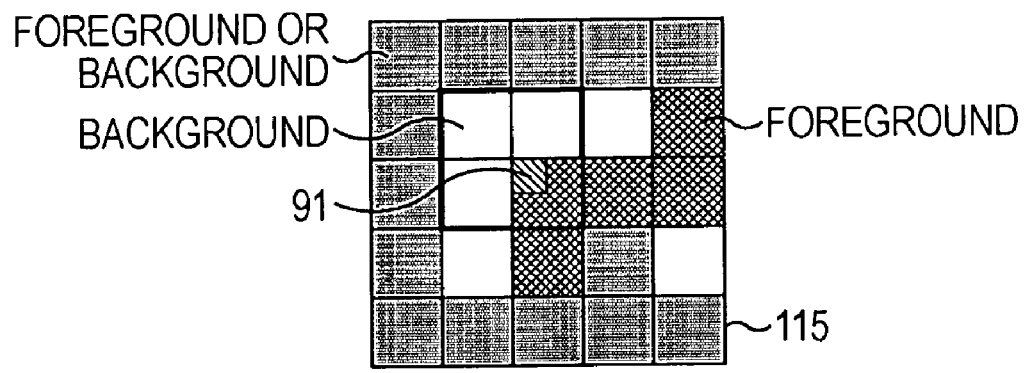
FIG. 16E is a diagram showing another example of the pattern used for the pattern determination.
Figure 18A:
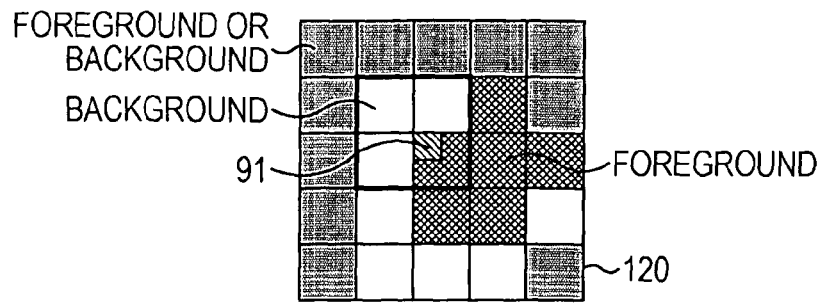
FIG. 18A is a diagram showing another example of the pattern used for the pattern determination.
Figure 18B:
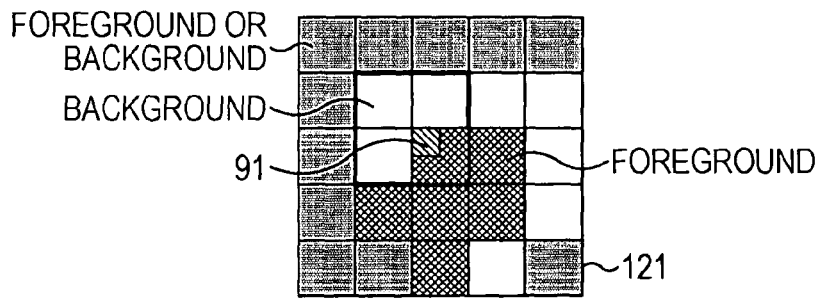
FIG. 18B is a diagram showing another example of the pattern used for the pattern determination.
Figure 18C:
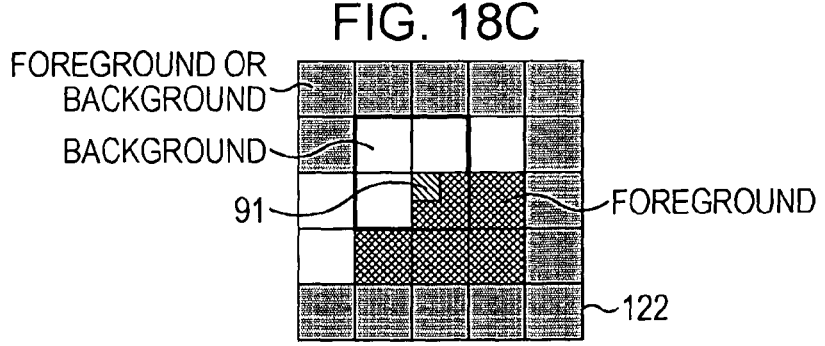
FIG. 18C is a diagram showing another example of the pattern used for the pattern determination.
Figure 18D:
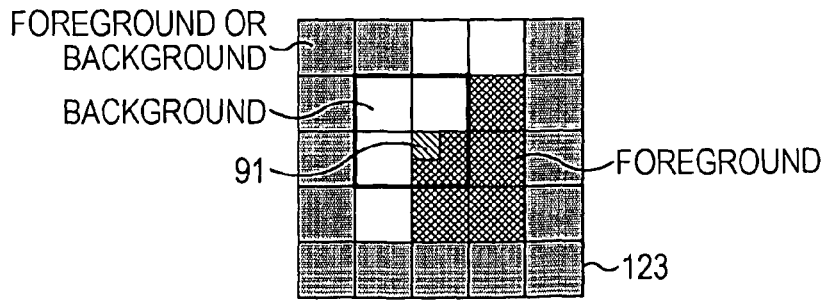
FIG. 18D is a diagram showing another example of the pattern used for the pattern determination.
Figure 19A:
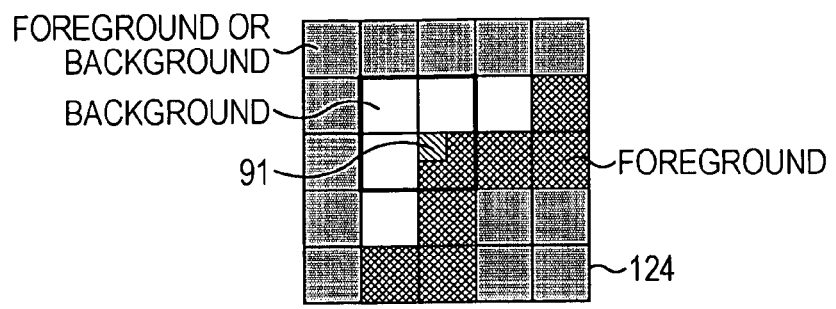
FIG. 19A is a diagram showing another example of the pattern used for the pattern determination.
Figure 19B:
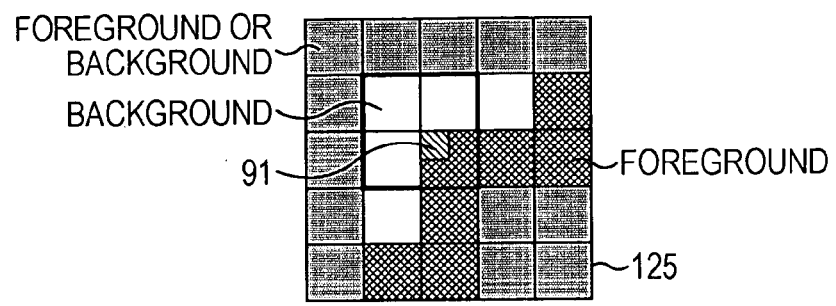
FIG. 19B is a diagram showing another example of the pattern used for the pattern determination.
Figure 19C:
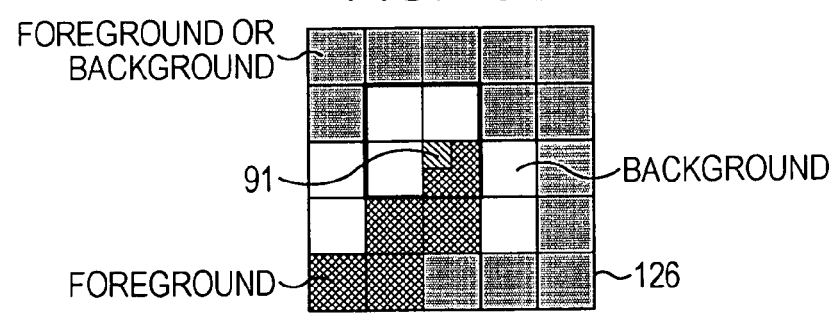
FIG. 19C is a diagram showing another example of the pattern used for the pattern determination.
Figure 19D:
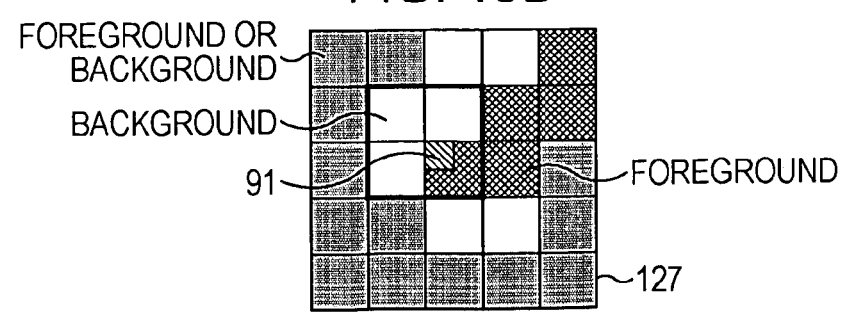
FIG. 19D is a diagram showing another example of the pattern used for the pattern determination.

Upon determining that the data of the region 81 (FIG. 13A) matches the pattern 83 (FIG. 13C), the wide-character processor 72 determines whether or not the data of the region 51 consisting of the 5 high×5 wide pixels matches a pattern 111 shown in FIG. 16A, a pattern 112 shown in FIG. 16B, a pattern 113 shown in FIG. 16C, a pattern 114 shown in FIG. 16D, a pattern 115 shown in FIG. 16E, a pattern 116 shown in FIG. 17A, a pattern 117 shown in FIG. 17B, a pattern 118 shown in FIG. 17C, a pattern 119 shown in FIG. 17D, a pattern 120 shown in FIG. 18A, a pattern 121 shown in FIG. 18B, a pattern 122 shown in FIG. 18C, a pattern 123 shown in FIG. 18D, a pattern 124 shown in FIG. 19A, a pattern 125 shown in FIG. 19B, a pattern 126 shown in FIG. 19C, and a pattern 127 shown in FIG. 19D. As a result of the determination, when it matches even one of the 17 patterns 111 to 127, the wide-character processor 72 sets "2" for the data selection flag.

Figure 20A:
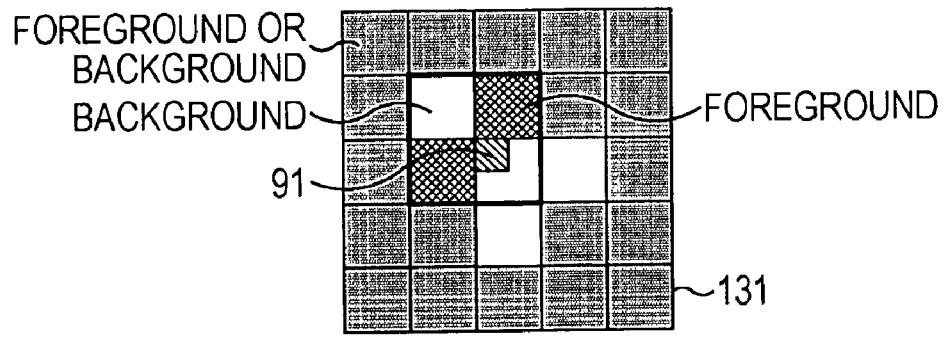
FIG. 20A is a diagram showing another example of the pattern used for the pattern determination.
Figure 20B:
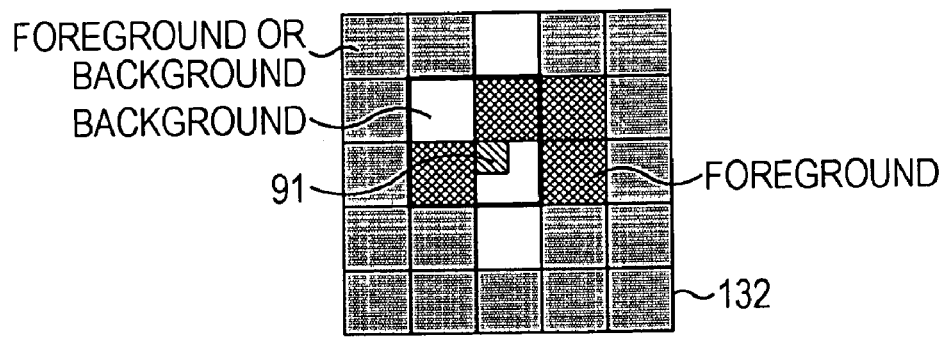
FIG. 20B is a diagram showing another example of the pattern used for the pattern determination.
Figure 20C:
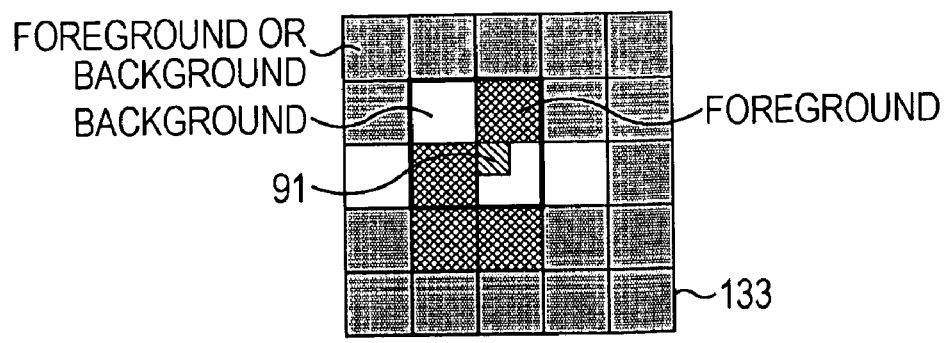
FIG. 20C is a diagram showing another example of the pattern used for the pattern determination.
Figure 20D:
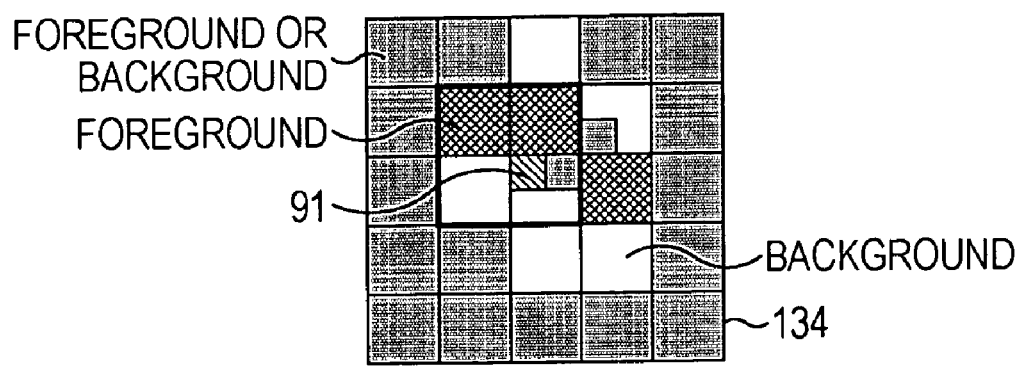
FIG. 20D is a diagram showing another example of the pattern used for the pattern determination.
Figure 20E:
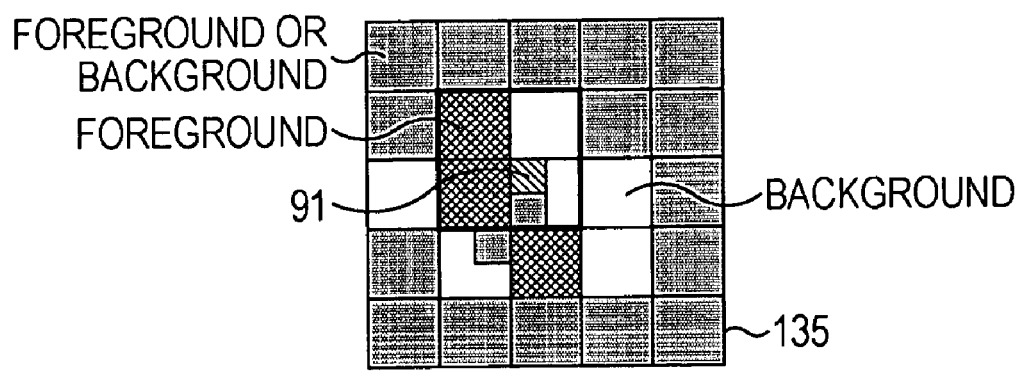
FIG. 20E is a diagram showing another example of the pattern used for the pattern determination.

Upon determining that the data of the region 81 (FIG. 13A) matches even one of the three patterns 84 to 86 (FIGS. 13D to 13F), the narrow-character processor 73 determines whether or not the data of the region 51 consisting of the 5 high×5 wide pixels matches a pattern 131 shown in FIG. 20A, a pattern 132 shown in FIG. 20B, a pattern 133 shown in FIG. 20C, a pattern 134 shown in FIG. 20D, and a pattern 135 shown in FIG. 20E. As a result of the determination, when it matches even one of the three patterns 131 to 133, the narrow-character processor 73 sets "3" for the data selection flag; when it matches the pattern 134, the narrow-character processor 73 sets "4" for the data selection; and when it matches the pattern 135, the narrow-character processor 73 sets "5" for the data selection flag.

Figure 21A:
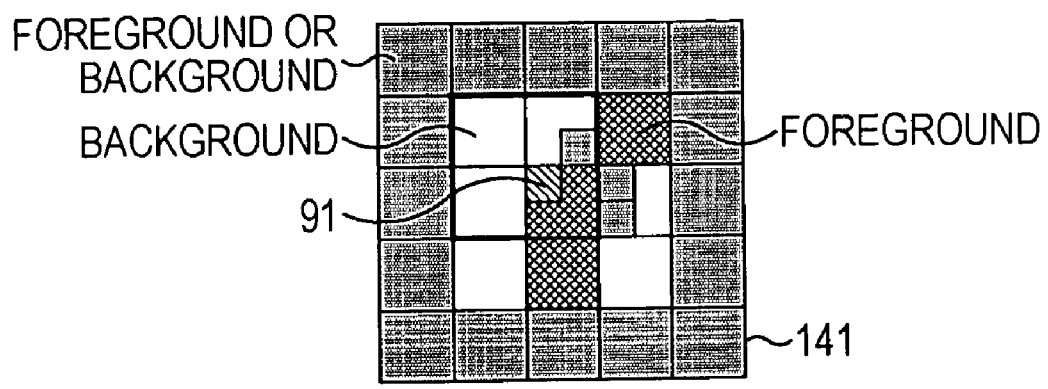
FIG. 21 is a diagram showing another example of the pattern used for the pattern determination.
Figure 21B:
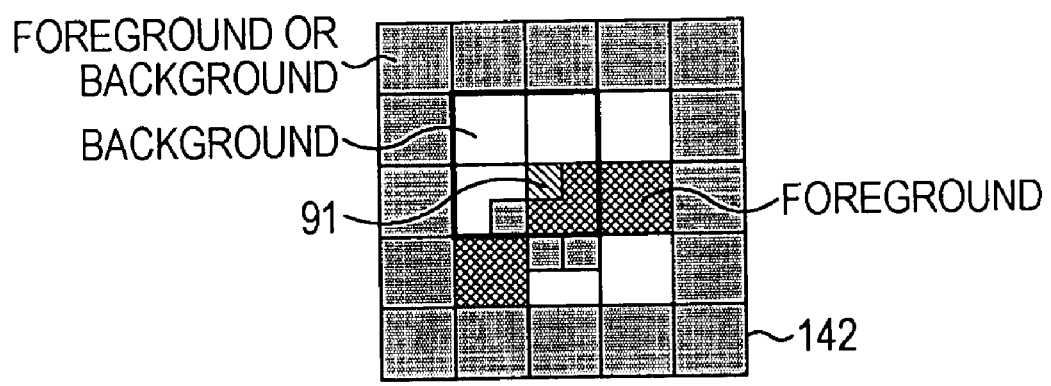

Upon determining that the data of the region 81 (FIG. 13A) matches the pattern 87 (FIG. 13G), the narrow-character processor 73 determines whether or not the data of the region 51 consisting of the 5 high×5 wide pixels matches a pattern 141 shown in FIG. 21A and a pattern 142 shown in FIG. 21B. As a result of the determination, when it matches even one of the two patterns 141 and 142, the narrow-character processor 73 sets "6" for the data selection flag.

As described above, as a result of the matching determination of the data of the region 51 consisting of the 5 high×5 wide pixels, one of the values "0" to "6" is set for the data selection flag. Each pattern used for the pattern determination is obtained as a result of simulation performed by the present inventor, but naturally is not limited thereto.

Figure 22:
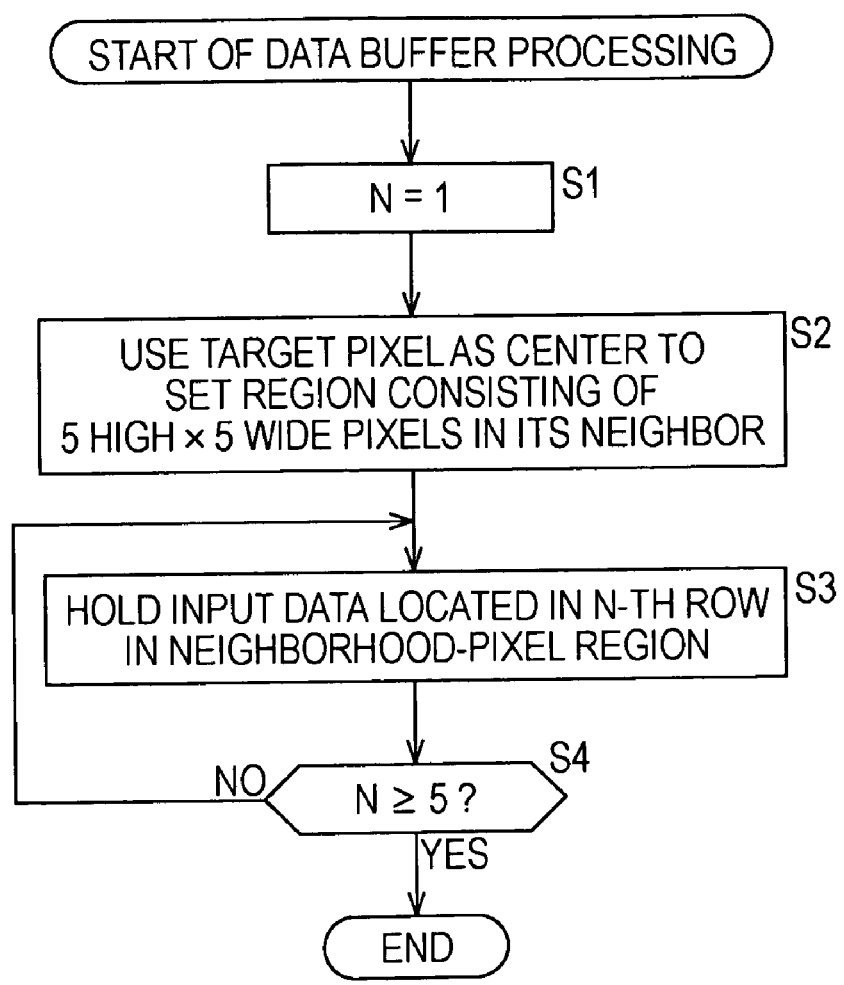
FIG. 22 is a flow chart illustrating processing executed by the data buffer.

Next, processing executed by the data buffer 32 will be described with reference to the flow chart of FIG. 22. This processing is started when input data is supplied from the OSD-plane memory 13.

In step S1, the data buffer 32 sets a variable N to 1 for initialization. In step S2, of the input data supplied from the OSD-plane memory 13, the data buffer 32 uses a target point 42 as the center to set the region 43 consisting of the 5 high×5 wide pixels in the neighborhood of the target point 42 (FIG. 5B). The region 43 having its center at the target pixel 42 and consisting of 5 high×5 wide pixels in the neighborhood thereof will hereinafter be referred to as "neighborhood-pixel region 43", as appropriate.

In step S3, the data buffer 32 holds input data located in the N-th row in the neighborhood-pixel region 43 set in the processing in step S2, in synchronization with a horizontal synchronization signal and a clock supplied from the control unit 31. For example, in FIG. 5C, data of pixels "D2L2", "D2L1", "D2C0", "D2R1", and "D2R2" is held. In step S4, the data buffer 32 determines whether or not the variable N has reached 5 or more, i.e., whether or not all the data of the neighborhood-pixel region 43 (FIG. 5C) is held. Upon determining that the variable N has not reached 5 or more, the process return to step S3 and the processing described above is repeatedly executed.

When it is determined in step S4 that the variable N has reached 5 or more, the processing is finished.

As a result of the processing described above, the data buffer 32 holds the data of the region 43 (FIG. 5C) consisting of the 5 high×5 wide pixels.

Figure 23:
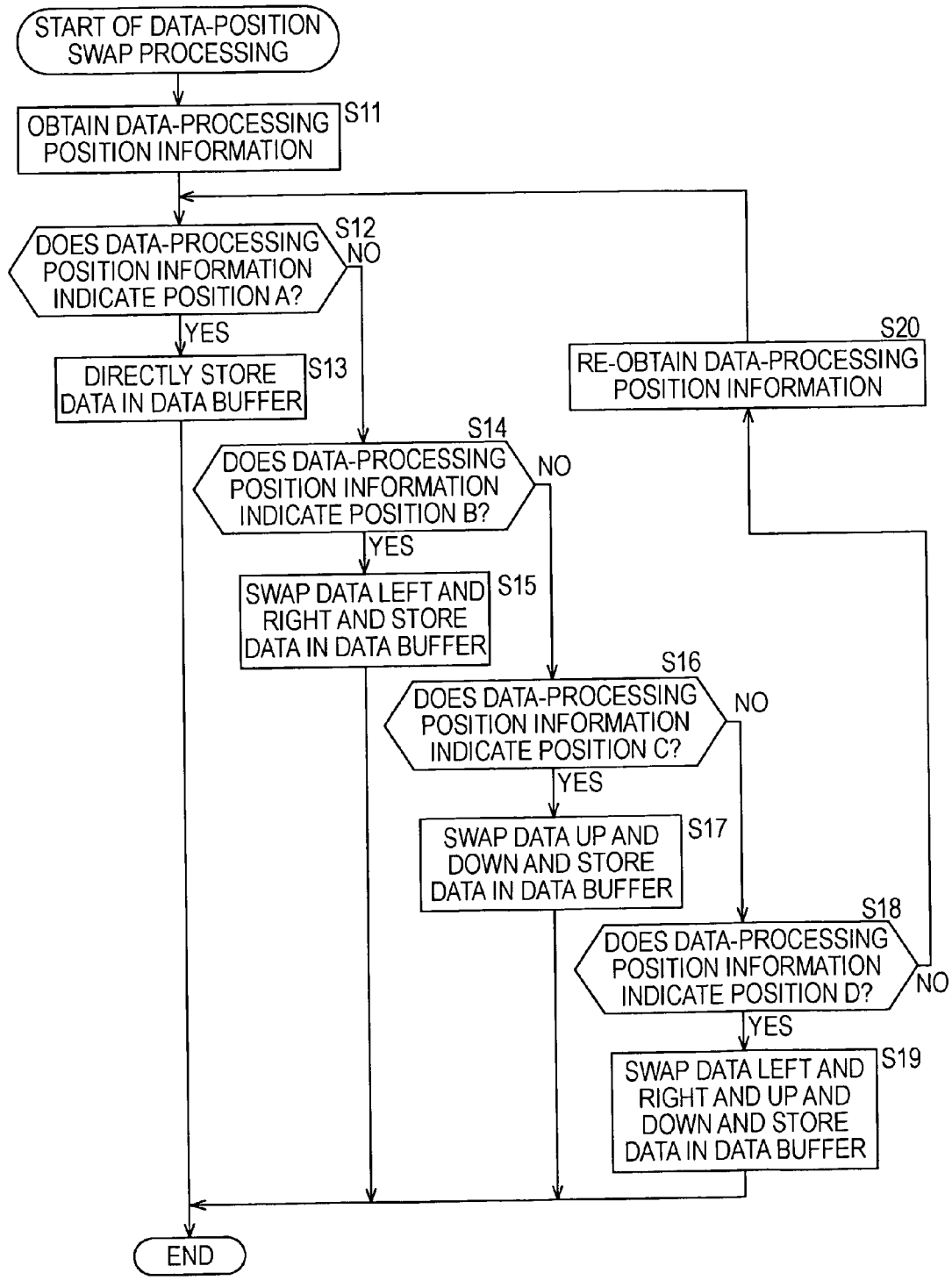
FIG. 23 is a diagram illustrating the data-position swapping method.

Next, data-position swapping processing executed by the data-position swapping unit 33 will be described with reference to the flow chart shown in FIG. 23. This processing is started when the data of the neighborhood-pixel region 43 are supplied from the data buffer 32.

In step S11, the data-position swapping unit 33 obtains data-processing position information (e.g., the position A shown in FIG. 7A, the position B shown in FIG. 8A, the position C shown in FIG. 9A, or the position D shown in FIG. 10A) supplied from the control unit 31. In step S12, the data-position swapping unit 33 determines whether or not the obtained data-processing position information indicates the position A (FIG. 7A).

When it is determined in step S12 that the data-processing position information indicates the position A, the process proceeds to step S13, in which the data-position swapping unit 33 directly stores the data of the neighborhood-pixel region 43 in the swapped-data buffer 33A without swapping the data positions thereof (FIG. 7B).

When it is determined in step S12 that the data-processing position information does not indicate the position A, the process proceeds to step S14, in which the data-position swapping unit 33 further determines whether or not the data-processing position information indicates the position B (FIG. 8A). When it is determined in step S14 that the data-processing position information indicates the position B, the process proceeds to step S15, in which the data-position swapping unit 33 swaps the data positions of the data of the neighborhood-pixel region 43 left and right (i.e., in the horizontal directions) and stores the resulting data in the swapped-data buffer 33A (FIG. 8B).

When it is determined in step S14 that the data-processing position information does not indicate the position B, the process proceeds to step S16, in which the data-position swapping unit 33 further determines whether or not the data-processing position information indicates the position C (FIG. 9A). When it is determined in step S16 that the data-processing position information indicates the position C, the process proceeds to step S17, in which the data-position swapping unit 33 swaps the data positions of the data of the neighborhood-pixel region 43 up and down (in the vertical directions) and stores the resulting data in the swapped-data buffer 33A (FIG. 9B).

When it is determined in step S16 that the data-processing position information does not indicate the position C, the process proceeds to step S18, in which the data-position swapping unit 33 further determines whether or not the data-processing position information indicates the position D (FIG. 10A). When it is determined in step S18 that the data-processing position information indicates the position D, the process proceeds to step S19, in which the data-position swapping unit 33 swaps the data positions of the data of the neighborhood-pixel region 43 left and right (in the horizontal directions) and up and down (in the vertical directions) and stores the resulting data in the swapped-data buffer 33A (FIG. 10B).

When it is determined in step S18 that the data-processing position information does not indicate the position D, the process proceeds to step S20, in which the data-position swapping unit 33 determines that an error occurred and re-obtains data-processing position information from the control unit 31. Thereafter, the process returns to step S12 and the processing described above is repeatedly executed.

As a result of the processing described above, the data (FIG. 6) of a new region 51 which consists of 5 high×5 wide pixels and whose data positions were sapped so as to allow the data to be handled as enlargement processing for the position A is stored in the swapped-data buffer 33A. The data of the region 51 consisting of the 5 high×5 wide pixels will be referred to as the data of a "neighborhood-pixel region 51".

Figure 24:
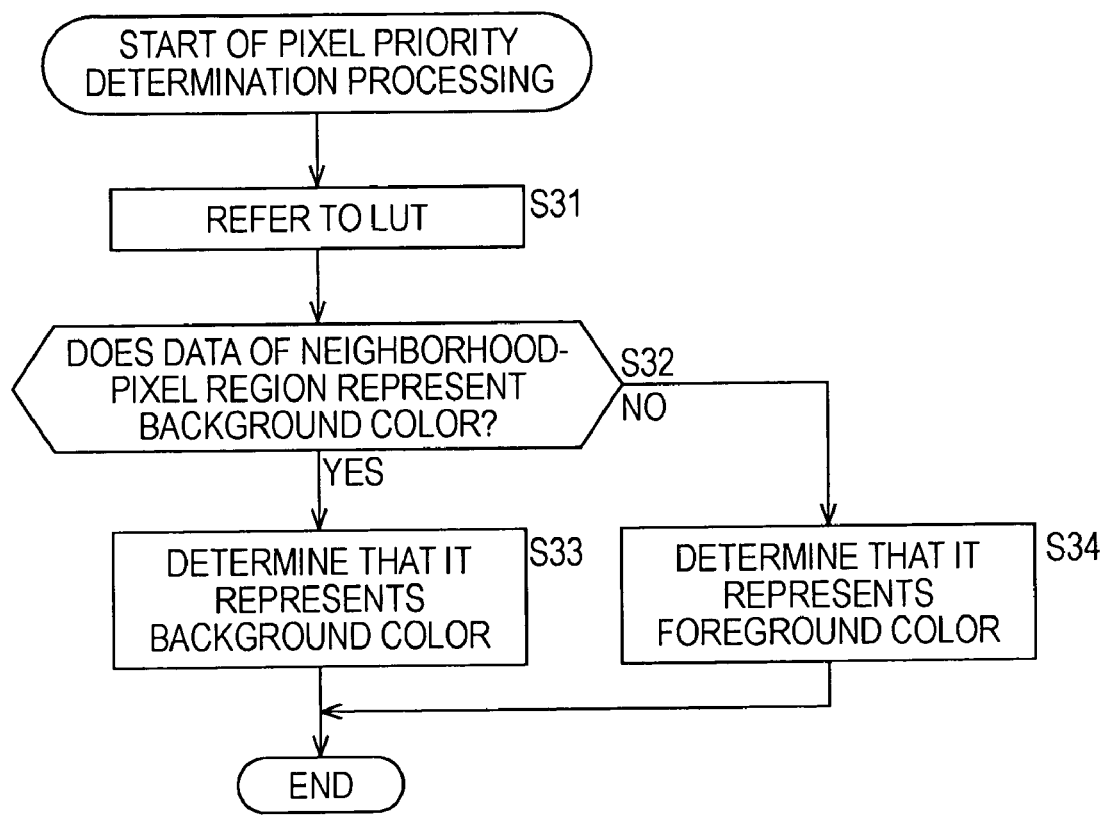
FIG. 24 is a flow chart illustrating pixel priority determination processing.

Next, pixel priority determination processing executed by the pixel priority determining unit 34 will be described with reference to the flow chart of FIG. 24. This processing is started when the data of the neighborhood-pixel region 51 are supplied from the swapped-data buffer 33A of the data-position swapping unit 33.

In step S31, the determining unit 61-1 of the data-position swapping unit 33 refers to the LUT 62-1. In step S32, the determining unit 61-1 determines whether or not the data of the pixel P[D2L2] in the neighborhood-pixel region 51 represents background color. When it is determined in step S32 that the data of the pixel P[D2L2] in the neighborhood-pixel region 51 represents background color, the process proceeds to step S33, in which the determining unit 61-1 determines (confirms) that the data of the pixel P[D2L2] in the neighborhood-pixel region 51 represents "background color".

When it is determined in step S32 that the data of the pixel P[D2L2] in the neighborhood-pixel region 51 does not represent background color, the process proceeds to step S34, in which the determining unit 61-1 determines (confirms) that the data of the pixel P[D2L2] in the neighborhood-pixel region 51 represents "foreground color".

Similarly, the determining units 61-2 to 61-25 also execute the processing described above to determine whether or not the data of each of the pixels P[D2L1] to P[U2R2] in the neighborhood-pixel region 51 represents "background color" or "foreground color".

As a result of the processing described above, each pixel value of the data of the neighborhood-pixel region 51 is uniquely determined to be either "background color" or "foreground color".

Next, data-selection-flag determination processing executed by the data-selection-flag determining unit 36 will be described with reference to the flow chart of FIG. 25. This processing is started when a pixel priority determination result for the data of the neighborhood-pixel region 51 is supplied from the pixel priority determining unit 34.

In step S41, the wide-character processor 72 and the narrow-character processor 73 in the data-selection-flag determining unit 36 set the corresponding data selection flags to "0" for initialization. In step S42, the character recognizing unit 71 in the data-selection-flag determining unit 36 obtains processing selection information supplied from the processing-mode control unit 35. The processing selection information obtained in this case contains information regarding whether to perform background-color expansion processing or foreground-color expansion processing.

In step S43, the character recognizing unit 71 in the data-selection-flag determining unit 36 refers to the font ROM 12 to recognize the character type ("wide character" or "narrow character") of the input data. When the processing selection information obtained in the processing in step S42 contains information regarding the character type, the processing in step S43 can be omitted.

In step S44, the character recognizing unit 71 determines whether or not a character to be subjected to enlargement processing is a wide character. Upon determining that it is a wide character, the character recognizing unit 71 supplies the data of the neighborhood-pixel region 51 and the processing selection information to the wide-character processor 72 and the process then proceeds to step S45. In step S45, the wide-character processor 72 performs wide-character processing based on the supplied data of the neighborhood-pixel region 51 and the processing selection information. In the wide-character processing, details of which will be described below with reference to the flow chart of FIG. 26, a wide-character pattern determination is made and a data selection flag corresponding to the pattern determination is output to the data selector 37.

When it is determined in step S44 that a character to be subjected to enlargement processing is not a wide character, i.e., is a narrow character, the character recognizing unit 71 supplies the data of the neighborhood-pixel region 51 and the processing selection information to the narrow-character processor 73 and the process then proceeds to step S46. In step S46, the narrow-character processor 73 performs narrow-character processing based on the supplied data of the neighborhood-pixel region 51 and the processing selection information. In the narrow-character processing, details of which will be described with reference to the flow chart of FIG. 27, pattern determination of the narrow character is made and a data selection flag corresponding to the pattern determination is output to the data selector 37.

Next, details of the wide-character processing executed by the wide-character processor 72 in step S45 shown in FIG. 25 will be described with reference to the flow chart of FIG. 26.

In step S51, of the data of the neighborhood-pixel region 51, the wide-character processor 72 determines whether or not the data (FIG. 13A) of the region 81 consisting of 2 high×2 wide pixels including the target point 42 matches a first pattern (in this case, the pattern 82 shown in FIG. 13B). When it is determined that the data of the region 81 matches the first pattern, the process proceeds to step S52. In addition, the wide-character processor 72 determines whether or not the data of the neighborhood-pixel region 51 matches any pattern of a second pattern group (in this case, the patterns 101 to 108 shown in FIGS. 14 to 15).

When it is determined in step S52 that the data of the neighborhood-pixel region 51 matches even one pattern of the second pattern group, the process proceeds to step S53, in which the wide-character processor 72 sets "1" for the data selection flag.

When it is determined in step S51 that the data of the region 81 does not match the first pattern or it is determined in step S52 that the data of the neighborhood-pixel region 51 does not match the second pattern group, the process proceeds to step S54. The wide-character processor 72 then determines whether or not to perform background-color expansion processing, based on the processing selection information obtained from the processing-mode control unit 35 in the processing in step S42 shown in FIG. 25.

When it is determined in step S54 that the background-color expansion processing is to be performed, the process proceeds to step S55, in which the wide-character processor 72 determines whether or not the data of the region 81 matches a third pattern (in this case, the pattern 83 shown in FIG. 13C). When it is determined in step S55 that the data of the region 81 matches the third pattern, the process proceeds to step S56, in which the wide-character processor 72 further determines whether or not the data of the neighborhood-pixel region 51 matches any pattern of a fourth pattern group (in this case, the patterns 111 to 127 shown in FIGS. 16 to 19).

When it is determined in step S56 that the data of the neighborhood-pixel region 51 matches even one pattern of the fourth pattern group, the process proceeds to step S57, in which the wide-character processor 72 sets "2" for the data selection flag.

Figure 25:
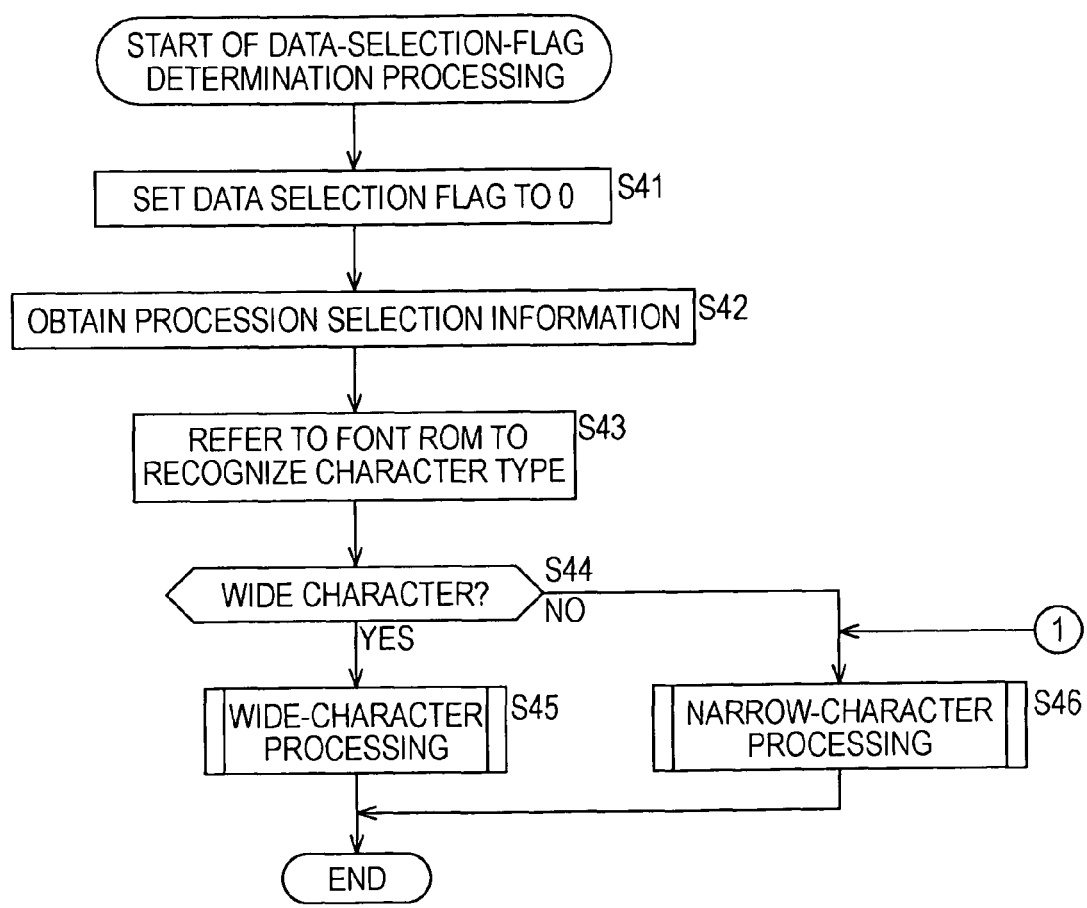
FIG. 25 is a flow chart illustrating data-selection-flag determination processing.
Figure 26:
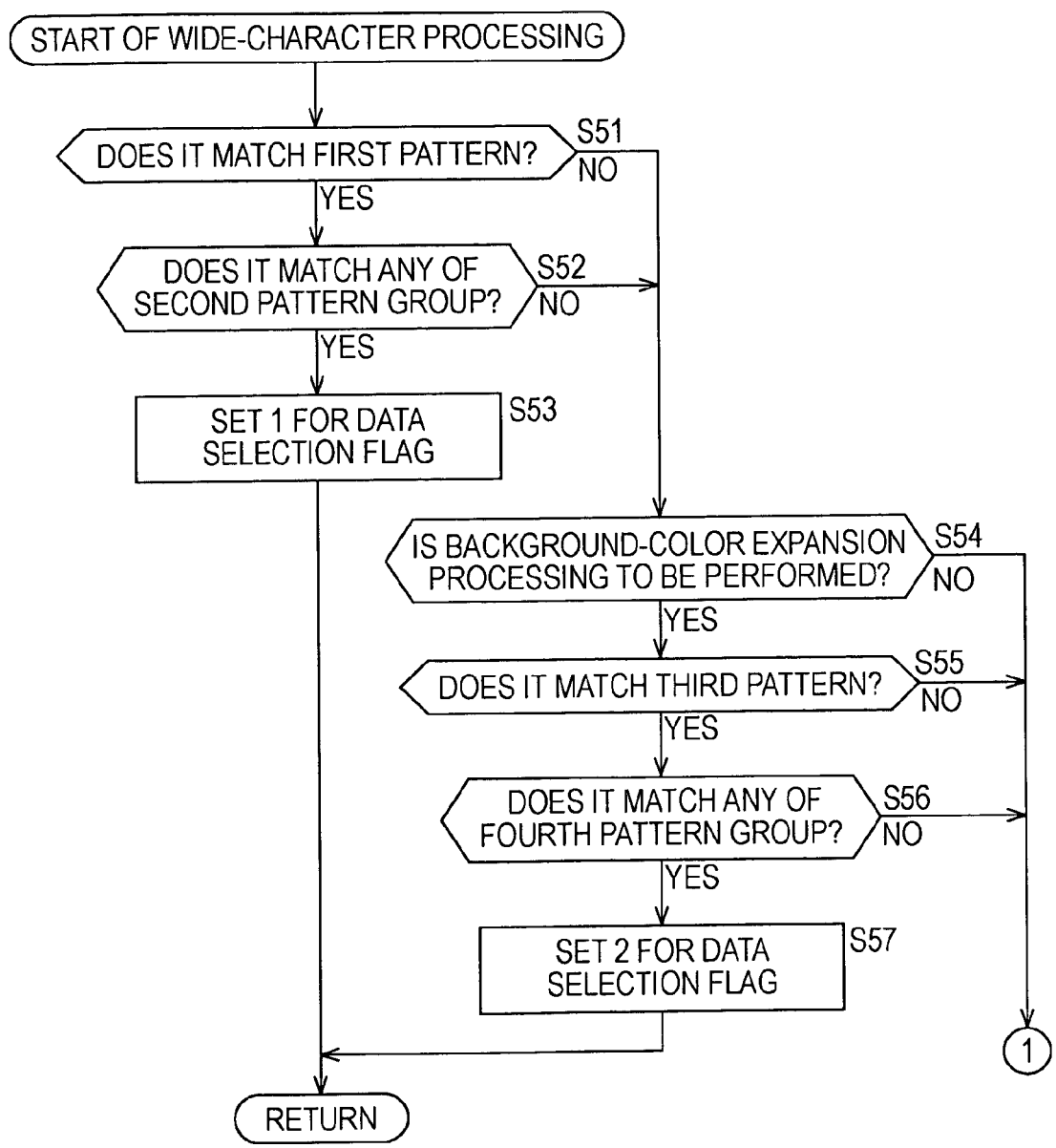
FIG. 26 is a flow chart illustrating details of wide-character processing in step S45 shown in FIG. 26.

When it is determined in step S54 that the background-color expansion processing is not to be performed, when it is determined in step S55 that the data of the region 81 does not match the third pattern, or when it is determined in step S56 that the data of the neighborhood-pixel region 51 does not match the fourth pattern group, the process returns to the narrow-character processing in step S46 shown in FIG. 25.

Figure 27:
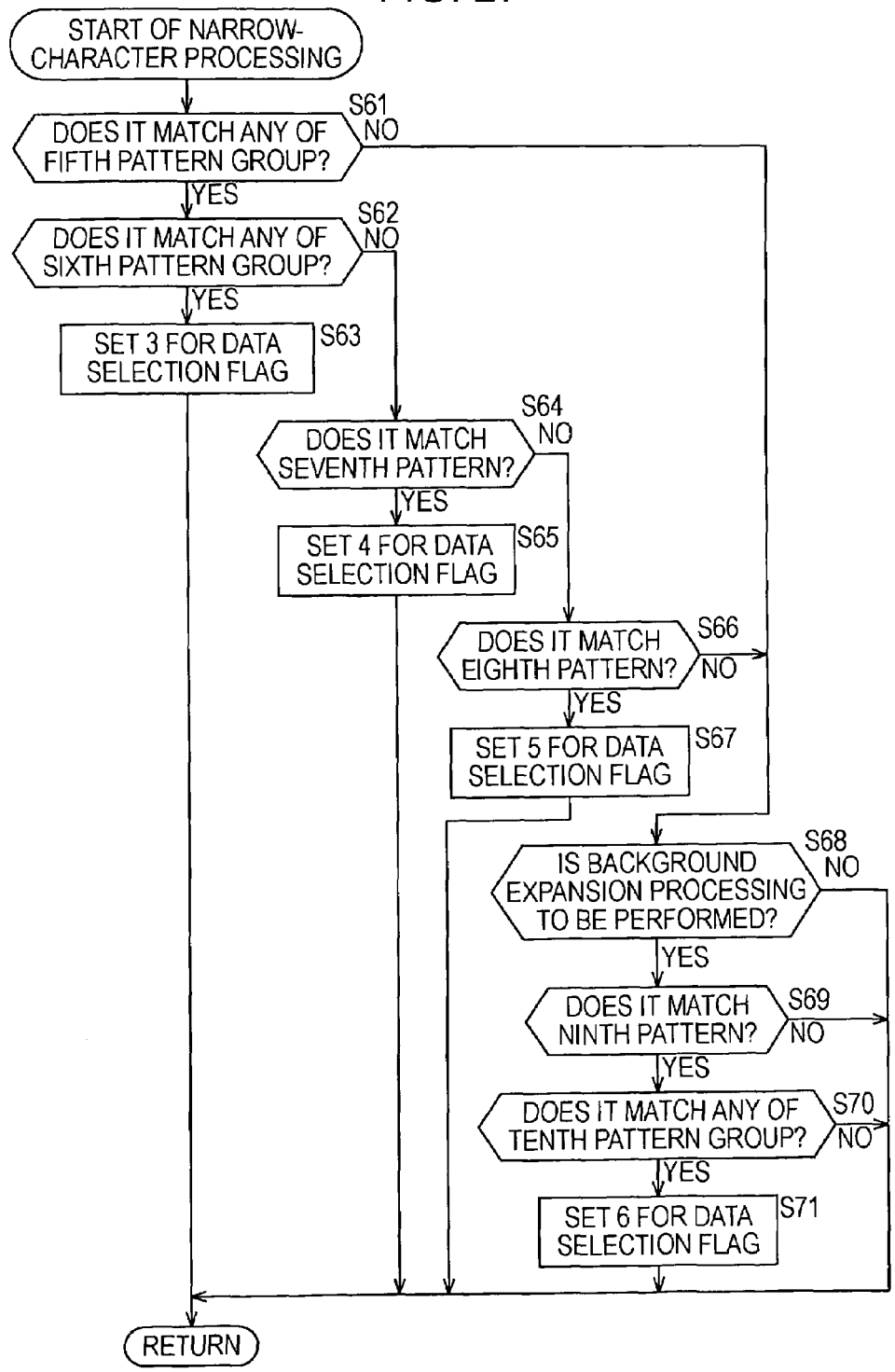
FIG. 27 is a flow chart illustrating details of narrow-character processing in step S46 shown in FIG. 25.

Next, details of the narrow-character processing executed by the narrow-character processor 73 in step S46 shown in FIG. 25 will be described with reference to the flow chart of FIG. 27.

In step S61, of the data of the neighborhood-pixel region 51, the narrow-character processor 73 determines whether or not the data (FIG. 13A) of the region 81 consisting of 2 high×2 wide pixels including the target point 42 matches a fifth pattern group (in this case, the patterns 84 to 86 shown in FIGS. 13D to 13F). When it is determined that the data of the region 81 matches even one pattern of the fifth pattern group, the process proceeds to step S62. The narrow-character processor 73 further determines whether or not the data of the neighborhood-pixel region 51 matches any pattern of a sixth pattern group (in this case, the patterns 131 to 133 shown in FIGS. 20A to 20C).

When it is determined in step S62 that the data of the neighborhood-pixel region 51 matches even one pattern of the sixth pattern group, the process proceeds to step S63, in which the narrow-character processor 73 sets "3" for the data selection flag.

When it is determined in step S62 that the data of the neighborhood-pixel region 51 does not match the sixth pattern group, the process proceeds to step S64, in which the narrow-character processor 73 further determines whether or not the data of the neighborhood-pixel region 51 matches a seventh pattern (in this case, the pattern 134 shown in FIG. 20D). When it is determined in step S64 that the data of the neighborhood-pixel region 51 matches the seventh pattern group, the process proceeds to step S65, in which the narrow-character processor 73 sets "4" for the data selection flag.

When it is determined in step S64 that the data of the neighborhood-pixel region 51 does not match the seventh pattern group, the process proceeds to step S66, in which the narrow-character processor 73 further determines whether or not the data of the neighborhood-pixel region 51 matches an eighth pattern (in this case, the pattern 135 shown in FIG. 20E). When it is determined in step S66 that the data of the neighborhood-pixel region 51 matches the eighth pattern group, the process proceeds to step S67, in which the narrow-character processor 73 sets "5" for the data selection flag.

When it is determined in step S66 that the data of the neighborhood-pixel region 51 does not match the eighth pattern or when it is determined in step S61 that the data of the region 81 does not match the fifth pattern group, the process proceeds to step S68. The narrow-character processor 73 then determines whether or not to perform background-color expansion processing, based on the processing selection information obtained from the processing-mode control unit 35 in the processing in step S42 shown in FIG. 25.

When it is determined in step S68 that the background-color expansion processing is to be performed, the process proceeds to step S69, in which the narrow-character processor 73 determines whether or not the data of the region 81 matches a ninth pattern (in this case, the pattern 87 shown in FIG. 13G). When it is determined in step S69 that the data of the region 81 matches the ninth pattern, the process proceeds to step S70, in which the narrow-character processor 73 further determines whether or not the data of the neighborhood-pixel region 51 matches any pattern of a tenth pattern group (in this case, the pattern 141 shown in FIG. 21A and the pattern 142 shown in FIG. 21B).

When it is determined in step S70 that the data of the neighborhood-pixel region 51 matches even one pattern of the tenth pattern group, the process proceeds to step S71, in which the narrow-character processor 73 sets "6" for the data selection flag.

When it is determined in step S68 that the background-color expansion processing is not to be performed, when it is determined in step S69 that the data of the region 81 does not match the ninth pattern, or when it is determined in step S70 that the data of the neighborhood-pixel region 51 does not match the tenth pattern group, the process returns to FIG. 25 and the data-selection-flag determination processing is finished.

As a result of the processing described above, one of the values "0" to "6" is set for the data selection flag.

Figure 28:
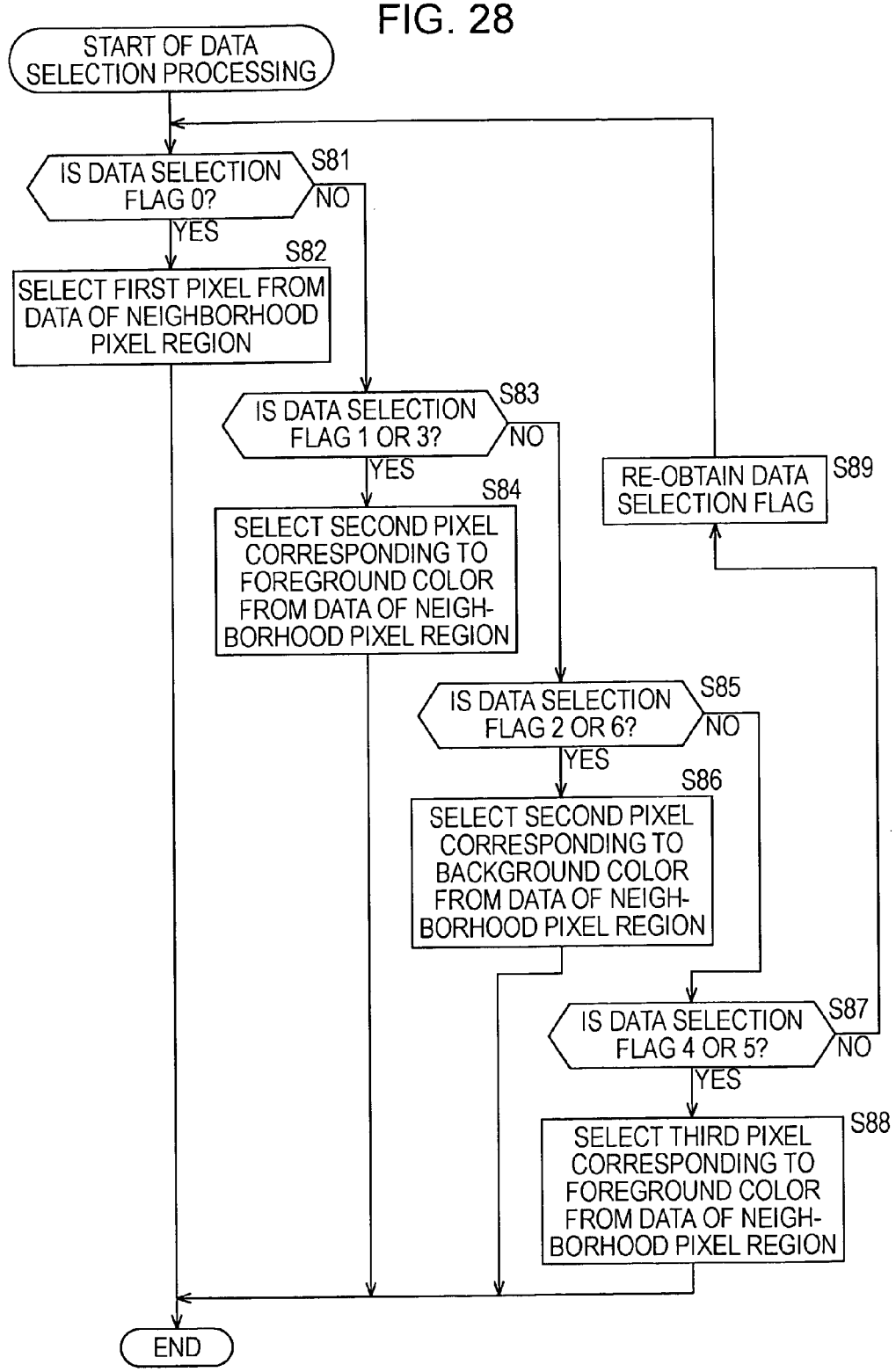
FIG. 28 is a flow chart illustrating data selection processing.

Next, data selection processing executed by the data selector 37 will be described with reference to the flow chart of FIG. 28. This processing is started when the data selection flag, which indicates a determination result, is supplied from the data-selection-flag determining unit 36.

In step S81, the data selector 37 determines whether or not the supplied data selection flag indicates "0". When it is determined that the data selection flag indicates "0", the process proceeds to step S82, in which the data selector 37 selects a first pixel (e.g., the pixel P[M0C0] shown in FIG. 6) from the neighborhood-pixel region 51 data supplied from the swapped-data buffer 33A in the data-position swapping unit 33.

When it is determined in step S81 that the data selection flag does not indicate "0", the process proceeds to step S83, in which the data selector 37 further determines whether or not the data selection flag indicates "1" or "3". When it is determined in step S83 that the data selection flag indicates "1" or "3", the process proceeds to step S84, in which the data selector 37 selects a second pixel corresponding to foreground color (e.g., the pixel P[M0L1] corresponding to the foreground color shown in FIG. 6) from the neighborhood-pixel region 51 data supplied from the swapped-data buffer 33A in the data-position swapping unit 33.

When it is determined in step S83 that the data selection flag does not indicate "1" or "3", the process proceeds to step S85, in which the data selector 37 further determines whether or not the data selection flag indicates "2" or "6". When it is determined in step S85 that the data selection flag indicates "2", or "6", the process proceeds to step S86. The data selector 37 selects a second pixel corresponding to background color (e.g., the pixel P[M0L1] corresponding to the background color shown in FIG. 6) from the neighborhood-pixel region 51 data supplied from the swapped-data buffer 33A in the data-position swapping unit 33.

When it is determined in step S85 that the data selection flag does not indicate "2", or "6", the process proceeds to step S87, in which the data selector 37 further determines whether or not the data selection flag indicates "4" or "5". When it is determined in step S87 that the data selection flag indicates "4" or "5", the process proceeds to step S88. The data selector 37 selects a third pixel corresponding to foreground color (e.g., the pixel P[U1L1] corresponding to the foreground color shown in FIG. 6) from the neighborhood-pixel region 51 data supplied from the swapped-data buffer 33A in the data-position swapping unit 33.

When it is determined in step S87 that the data selection flag does not indicate "4" or "5", the process proceeds to step S89, in which the data selector 37 determines that an error occurred and re-obtains a data selection flag from the data-selection-flag determining unit 36. Thereafter, the process returns to step S81 and the processing described above is repeatedly executed.

As a result of the processing described above, the data selector 37 selects one specific pixel corresponding to the data selection flag and outputs, as output data, the selected pixel to the mixer 15. The specific pixel selected in this process is merely one example. Thus, naturally, another pixel may be selected or a specific pixel may be selected by predetermined computation.

Next, simulation results of the enlargement processing will be described with reference to FIGS. 29 to 34.

Figure 29A:
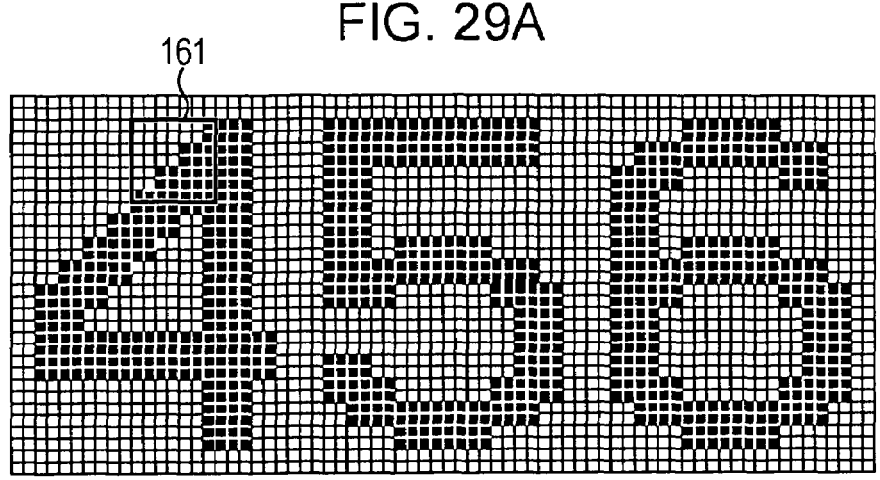
FIG. 29A is a view showing a simulation result.
Figure 29B:
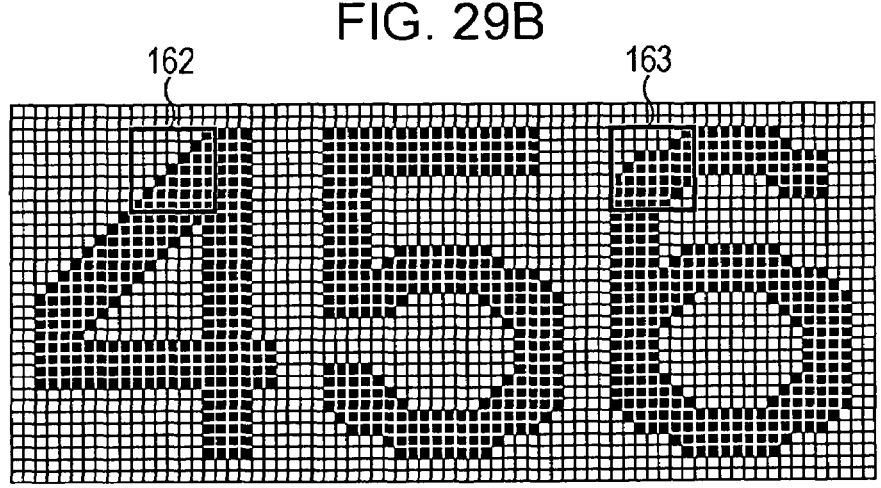
FIG. 29B is a view showing a simulation result.
Figure 29C:
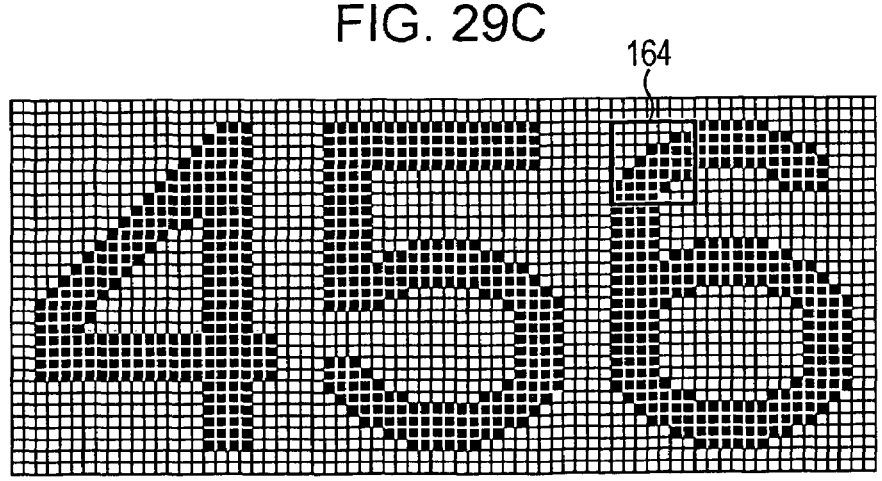
FIG. 29C is a view showing a simulation result.
Figure 30A:
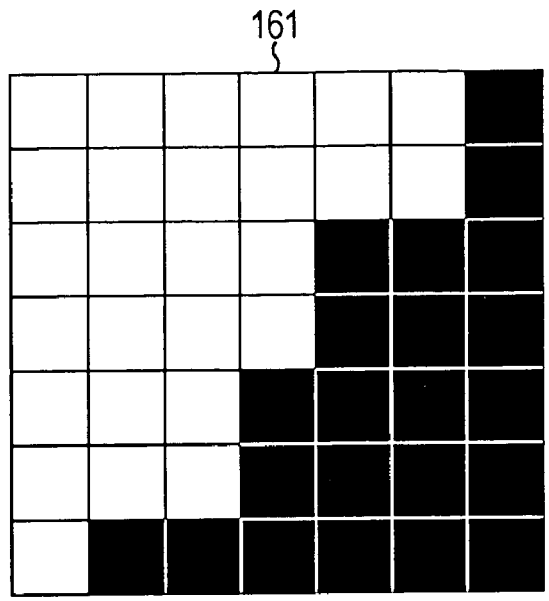
FIG. 30A is a partially enlarged view of FIG. 29.
Figure 30B:
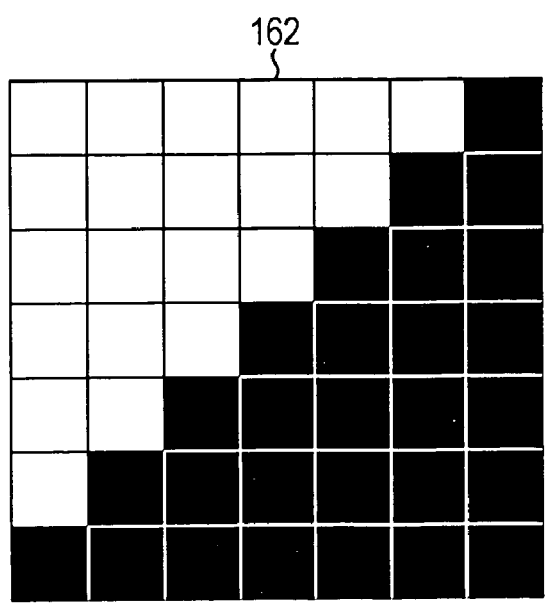
FIG. 30B is a partially enlarged view of FIG. 29.
Figure 31A:
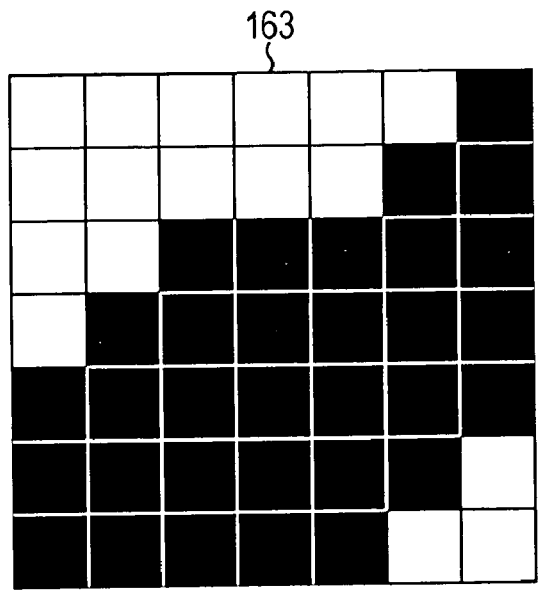
FIG. 31A is another partially enlarged view of FIG. 29.
Figure 31B:
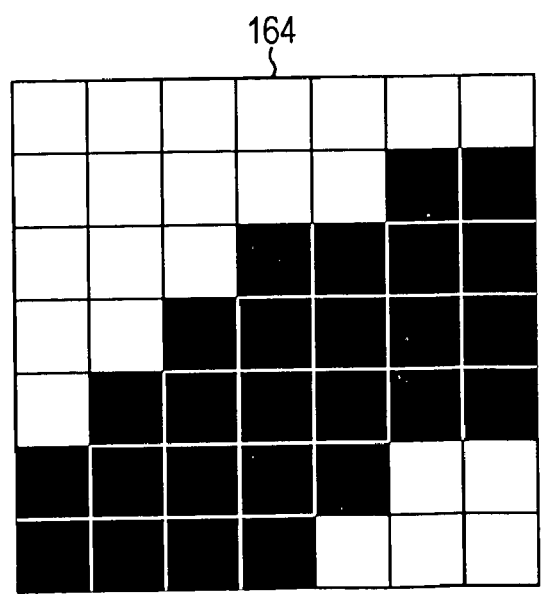
FIG. 31B is another partially enlarged view of FIG. 29.

FIG. 29A shows a simulation result obtained when wide characters were subjected to enlargement processing using conventional nearest neighbor interpolation. FIG. 29B shows a simulation result obtained when wide characters were subjected to foreground-color extension processing using the wide-character processor 72. FIG. 29C shows a simulation result obtained when wide characters were subjected to foreground-color extension processing and background-color extension processing using the wide-character processor 72. FIG. 30A is an enlarged view of a region 161 shown in FIG. 29A. FIG. 30B is an enlarged view of a region 162 shown in FIG. 29B. FIG. 31A is an enlarged view of a region 163 shown in FIG. 29B. FIG. 31B is an enlarged view of a region 163 shown in FIG. 29C.

In FIGS. 29 to 31, the pixels having foreground color are expressed by black and pixels having background color are expressed by white (the same applies to FIGS. 32 to 34 for which descriptions will be given later). The uppermost left pixel in each region shown in FIGS. 30 and 31 is expressed as pixel (1, 1) and a pixel located at the m-th position in the horizontal directions and the n-th position in the vertical directions is expressed as pixel (m, n) (the same applies to FIGS. 33 and 34 for which descriptions will be given later).

As compared to the simulation result (FIG. 30A) obtained by the enlargement processing using the conventional nearest neighbor interpolation, the simulation result (FIG. 30) obtained by the foreground-color extension processing using the wide-character processor 72 shows that the pixels (6, 2), (4, 4), (3, 5), (3, 6), (2, 6), and (1, 7) were interpolated from background color (white) to foreground color (black).

Also, as compared to the simulation result (FIG. 31A) obtained by the foreground-color extension processing using the wide-character processor 72, the simulation result (FIG. 31B) obtained by the foreground-color extension processing and the background-color extension processing using the wide-character processor 72 shows that the pixels (7, 1), (3, 3), (2, 4), (1, 5), (6, 6), and (5, 7) were interpolated from foreground color (black) to background color (white).

Figure 32A:
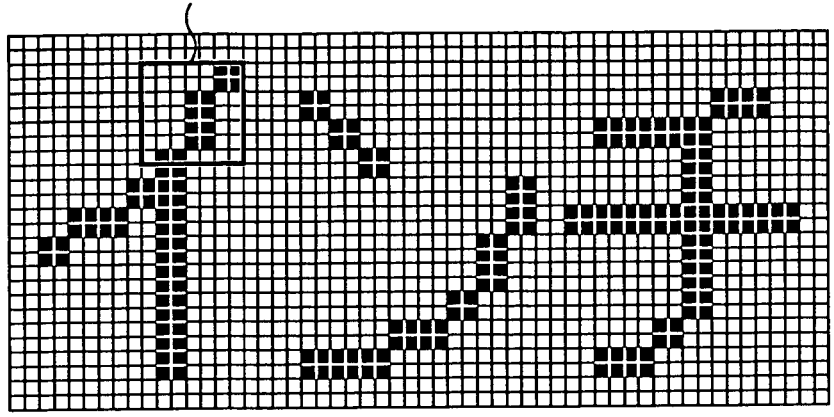
FIG. 32A is a view showing a simulation result.
Figure 32B:
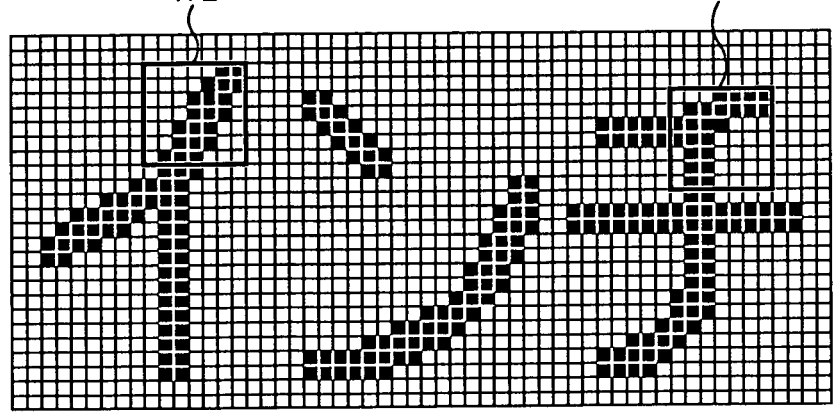
FIG. 32B is a view showing a simulation result.
Figure 32C:
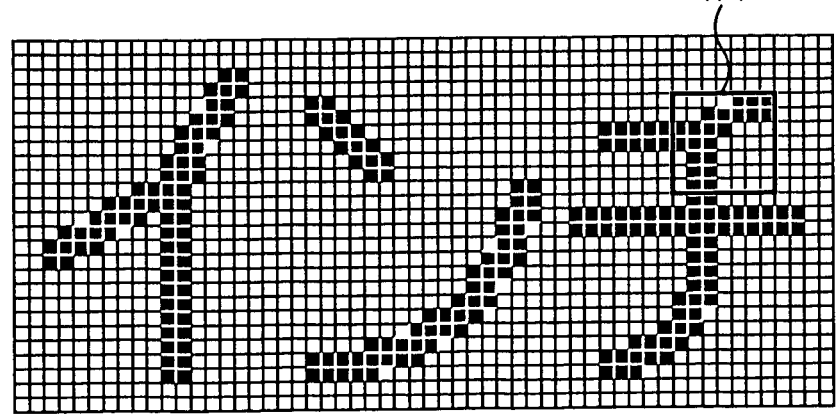
FIG. 32C is a view showing a simulation result.
Figure 33A:
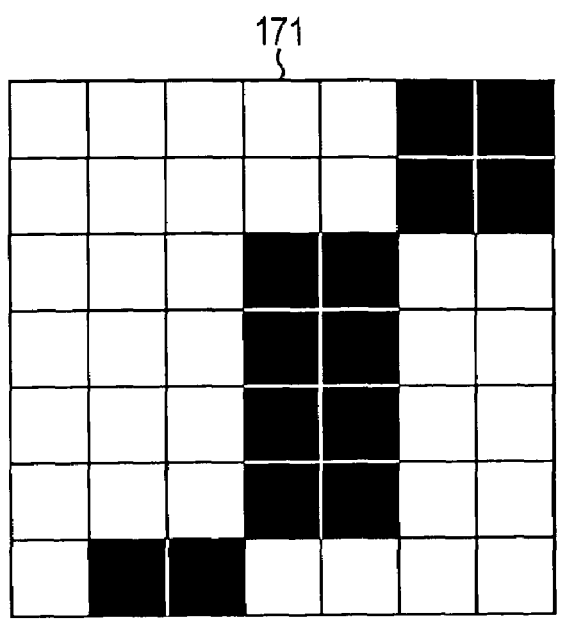
FIG. 33A is a partially enlarged view of FIG. 32.
Figure 33B:
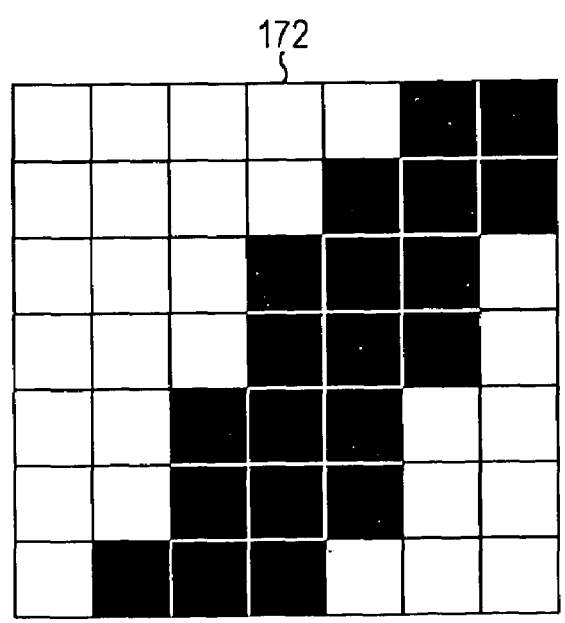
FIG. 33B is a partially enlarged view of FIG. 32.
Figure 34A:
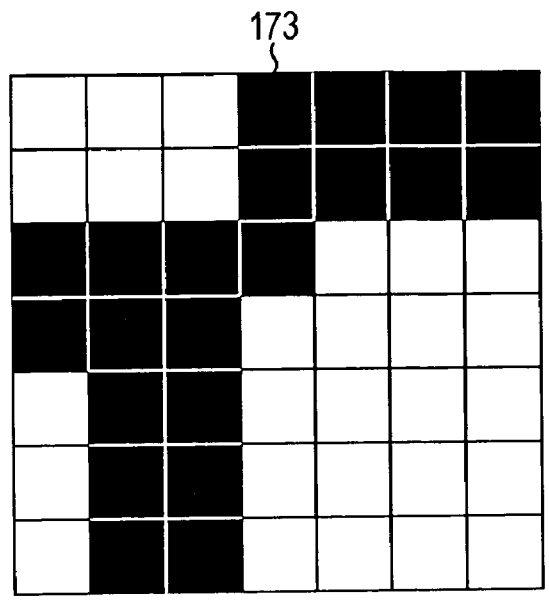
FIG. 34A is another partially enlarged view of FIG. 32.
Figure 34B:
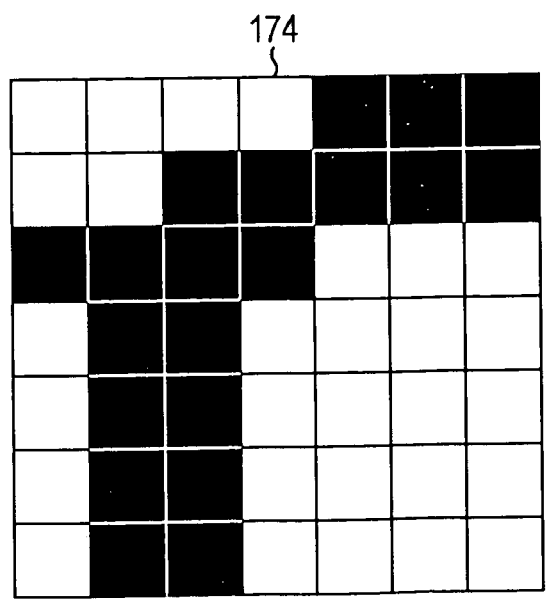
FIG. 34B is another partially enlarged view of FIG. 32.

FIG. 32A shows a simulation result obtained when narrow characters were subjected to enlargement processing using the conventional nearest neighbor interpolation. FIG. 32B shows a simulation result obtained when narrow characters were subjected to foreground enlargement processing using the narrow-character processor 73. FIG. 32C shows a simulation result obtained when narrow characters were subjected to foreground-color extension processing and background-color extension processing using the narrow-character processor 73. FIG. 33A is an enlarged view of a region 171 shown in FIG. 32A. FIG. 33B is an enlarged view of a region 172 shown in FIG. 32B. FIG. 34A is an enlarged view of a region 173 shown in FIG. 32B. FIG. 34B is an enlarged view of a region 174 shown in FIG. 32C.

As compared to the simulation result (FIG. 33A) obtained by the enlargement processing using the conventional nearest neighbor interpolation, the simulation result (FIG. 33B) obtained by the foreground-color extension processing using the narrow-character processor 73 shows that the pixels (5, 2), (6, 3), (6, 4), (3, 5), (3, 6), and (4, 7) were interpolated from background color (white) to foreground color (black).

Also, as compared to the simulation result (FIG. 34A) obtained by the foreground-color extension processing using the narrow-character processor 73, the simulation result (FIG. 34B) obtained by the foreground-color extension processing and the background-color extension processing using the narrow-character processor 73 shows that the pixels (4, 1) and (1, 4) were interpolated from foreground color (black) to background color (white) and the pixel (3, 2) is interpolated from background color to foreground color.

As described above, by changing the processing in accordance with a character characteristic (i.e., a wide character or narrow character), it is possible to perform high-quality enlargement processing.

Although the enlargement processing for binarized images composed of white (background color) and black (foreground color) has been described above, the present invention is not limited thereto. That is, enlargement processing can be performed on multi-valued gradation images composed of values more than binary values, such as outline characters and shadow characters. In this case, the basic configuration example is the same as that of the image enlarging device 21 shown in FIG. 4, and the configuration can be realized by changing the internal processing of the pixel priority determining unit 34 and the data-selection-flag determining unit 36.

Figure 35:
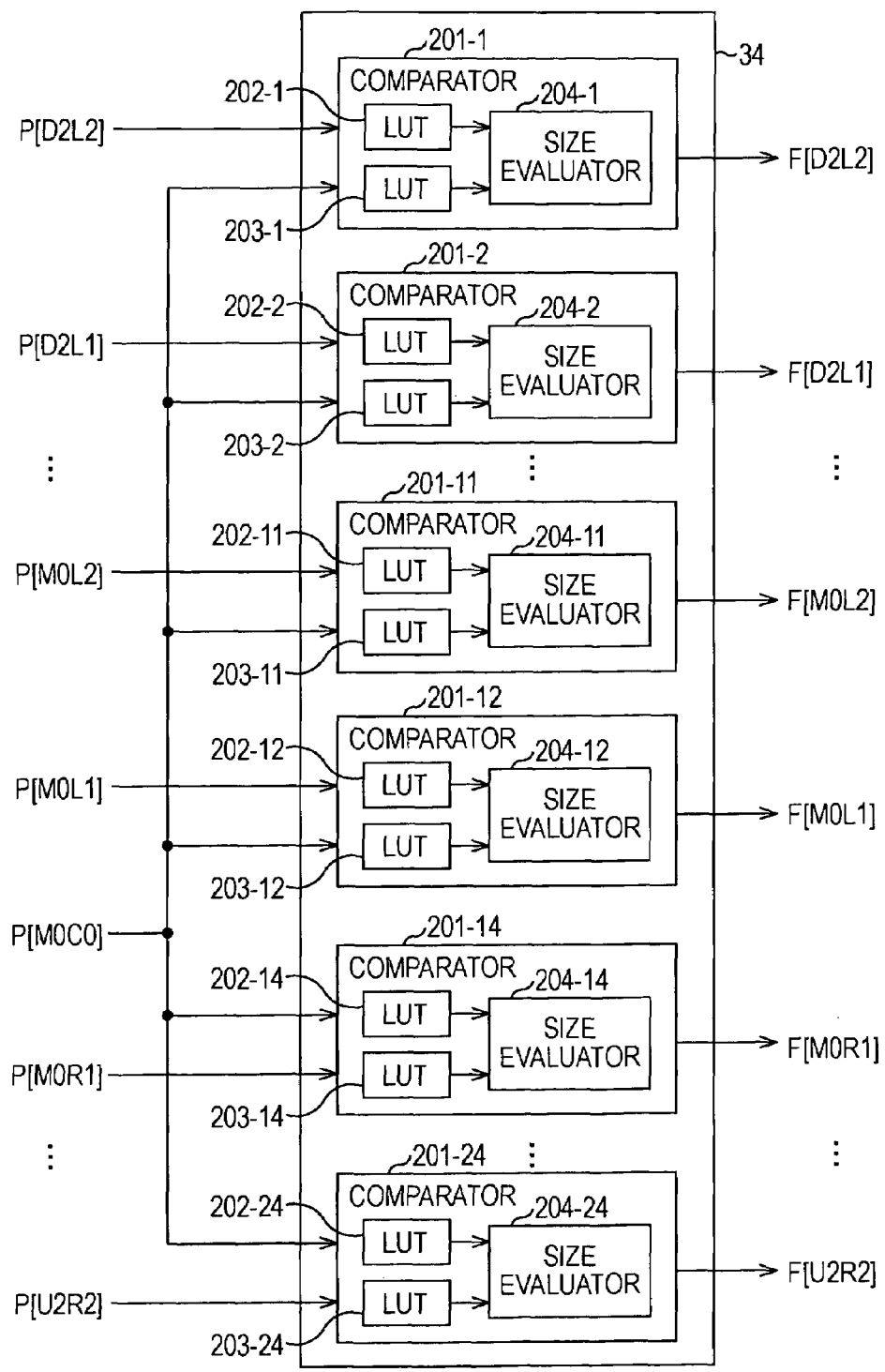
FIG. 35 is a block diagram showing an example of a detailed configuration of the pixel priority determining unit when it is applied to a multi-valued gradation image.

FIG. 35 is a block diagram showing an example of a detailed configuration of the pixel priority determining unit 34 when it is applied to a multi-valued gradation image.

As shown in the figure, the pixel priority determining unit 34 includes comparators 201-1 to 201-24. The comparators 201-1 to 201-24 have LUTs 202-1 to 202-24, LUTs 203-1 to 203-24, and size comparators 204-1 to 204-24, respectively. For example, black, white, and yellow are set for the foreground color, background color, and foreground outlines, respectively, in the LUTs 202-1 and 202-24 and the LUTs 203-1 to 203-24, based on the background determination information, foreground determination information, and outline determination information supplied from the processing-mode control unit 35.

Of the data of the region 51 (FIG. 6) consisting of the 5 high×5 wide pixels which is supplied from the data-position swapping unit 33, the comparator 201-1 inputs the data of the pixel P[D2L2], and converts the pixel value thereof into a value given a priority order for processing the pixel value, based on the LUT 202-1. Further, of the data of the region 51, the comparator 201-1 inputs the data of the pixel P[M0C0] (i.e., the target point 42), and converts the pixel value thereof into a value given a priority order for processing the pixel value, based on the LUT 203-1.

That is, as described above, since black, white, and yellow are set for the foreground color, background color, and foreground outlines, respectively, in the LUTs 202-1 and 203-1, the priority order in this case is generally "black>yellow (outline)>white". Thus, for example, the pixel value is converted into a value given an order, such as an order of black=100, outline=50, and white=1.

Figure 36:
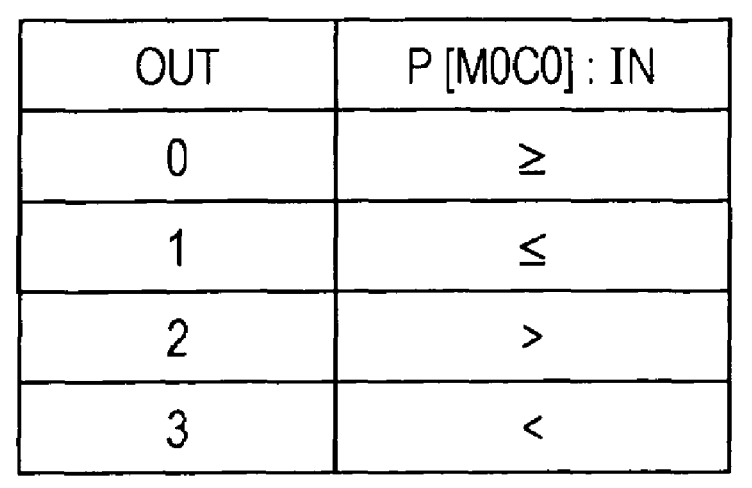

In accordance with the converted value, the size comparator 204-1 compares the data of the target point 42 (the pixel P[M0C0]) with the data (the value that is given the order) of the pixel P[D2L2] (IN), assigns a code shown in FIG. 36, and outputs the comparison result as F[X] to the data-selection-flag determining unit 36. X in this case indicates a position relative to the target point 42.

As shown in FIG. 36, "0" is assigned for P[M0C0]≧P[D2L2] (IN), "1" is assigned for P[M0C0]≦P[D2L2] (IN), "2" is assigned for P[M0C0]>P[D2L2] (IN), and "3" is assigned for P[M0C0]<P[D2L2] (IN).

Of the data of the region 51 (FIG. 6) consisting of the 5 high×5 wide pixels which is supplied from the data-position swapping unit 33, the comparators 201-2 and 201-24 input the data of the pixels P[D2L1] to P[U2R2], respectively, and convert the pixel values thereof into values given priority orders for processing the pixel values, based on the LUTs 202-2 to 202-24. Further, of the data of the region 51, the comparators 201-2 to 201-24 input the data of the pixel P[M0C0] (i.e., the target point 42), and convert the pixel value thereof into a value given a priority order for processing the pixel value, based on the LUTs 203-2 and 203-24. In accordance with the converted values, the size comparators 204-2 to 204-24 compare the data of the target point 42 (the pixel P[M0C0]) with the data of each of the pixels P[D2L1] to P[U2R2] (IN), assign the code shown in FIG. 36, and output the comparison result in the form of F[X] to the data-selection-flag determining unit 36.

A comparator for the target point 42 is not required, but the arrangement may be such that default code "0" is assigned to the target point 42 and the comparison result is output to the data-selection-flag determining unit 36.

In the case of the foreground-color extension processing, the target point 42 has background color. Thus, when F[X] supplied from the pixel priority determining unit 34 indicates code "3", the data-selection-flag determining unit 36 determines that it is foreground color, and when F[X] indicates code "0", the data-selection-flag determining unit 36 determines that it is background color. Also, in the case of the background-color extension processing, the target point 42 has foreground color. Thus, when F[X] supplied from the pixel priority determining unit 34 indicates code "1", the data-selection-flag determining unit 36 determines that it is foreground color, and when F[X] indicates code "2", the data-selection-flag determining unit 36 determines that it is background color.

Through the determination described above, it is possible to perform high-quality enlargement processing on multi-valued gradation images.

Next, simulation results of enlargement processing for multi-valued gradation images will be described with reference to FIGS. 37 and 38.

Figure 37A:
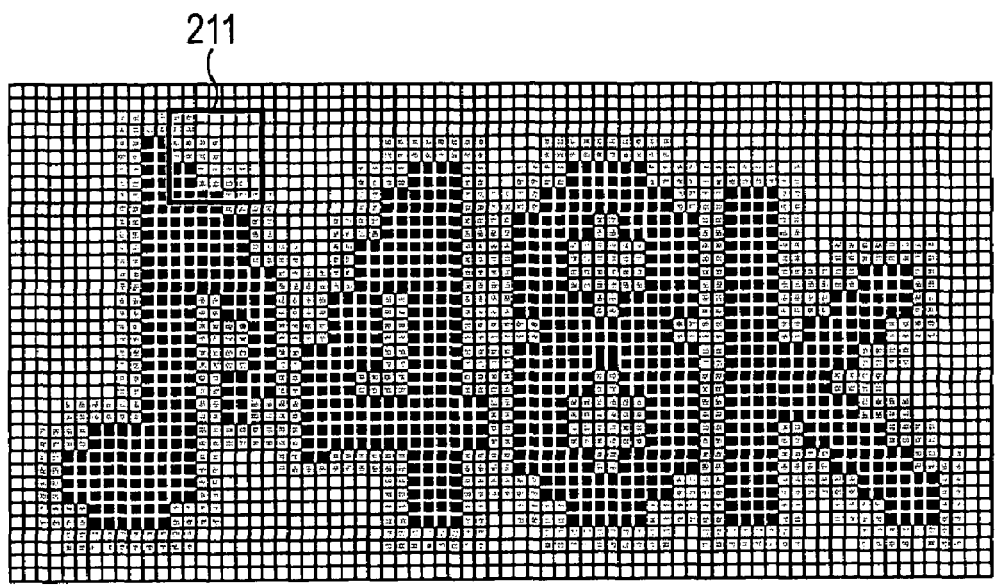
FIG. 37A is a view showing a simulation result.
Figure 37B:
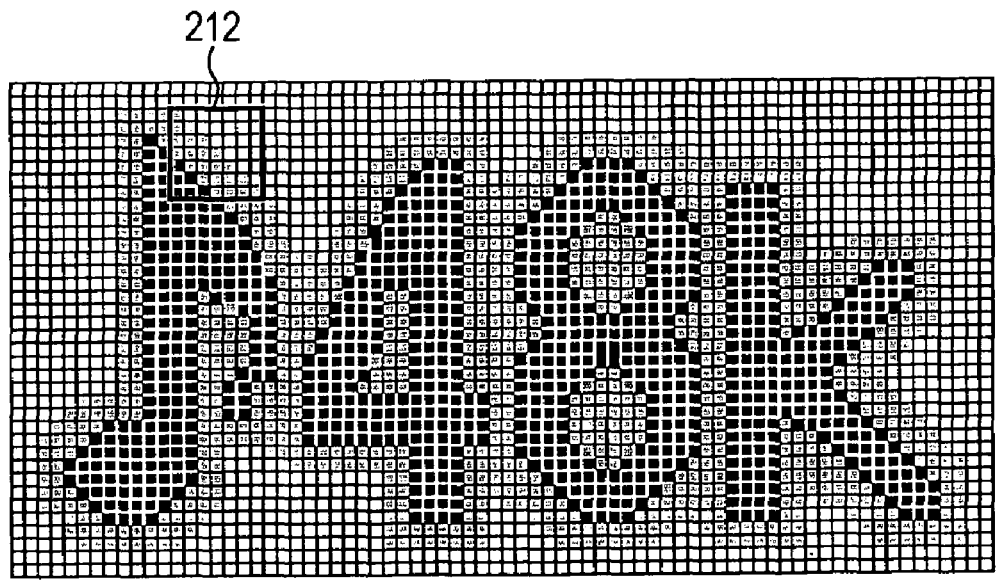
FIG. 37B is a view showing a simulation result.
Figure 38A:
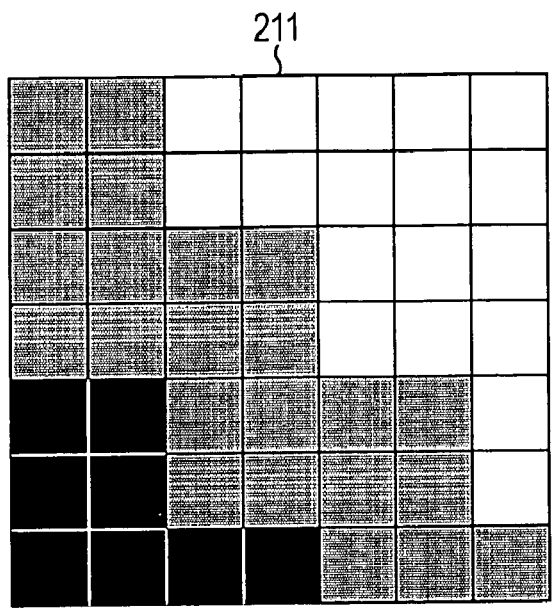
FIG. 38A is a partially enlarged view of FIG. 37.
Figure 38B:
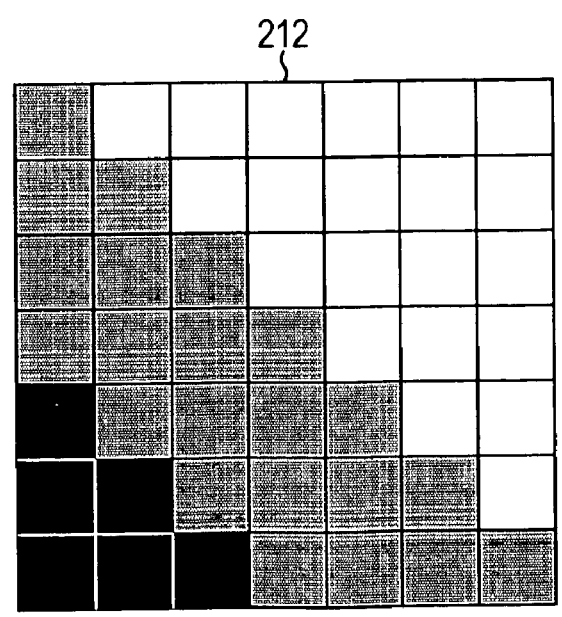
FIG. 38B is a partially enlarged view of FIG. 37.

FIG. 37A shows a simulation result obtained when multi-valued gradation characters were subjected to enlargement processing using the conventional nearest neighbor interpolation. FIG. 37B shows a simulation result obtained when multi-valued gradation characters were subjected to the enlargement processing according to the present invention. FIG. 38A is an enlarged view of a region 211 shown in FIG. 37A and FIG. 38B shows an enlarged view of a region 212 shown in FIG. 37B.

In FIGS. 37 and 38, the pixels having foreground color are expressed by black, pixels having background color are expressed by white, and pixels for outlines are expressed by gray. The uppermost left pixel in each region shown in FIG. 38 is expressed as pixel (1, 1) and a pixel located at the m-th position in the horizontal directions and the n-th position in the vertical directions is expressed as pixel (m, n).

As compared to the simulation result (FIG. 38A) obtained by the enlargement processing using the conventional nearest neighbor interpolation, the simulation result (FIG. 38B) obtained by the enlargement processing according to the present invention shows that pixels (2, 1), (4, 3), and (6, 5) were interpolated from outlines (gray) to background color (white) and the pixels (2, 5) and (4, 7) were interpolated from foreground color to outlines.

As described above, according to the present invention, it is possible to perform high-quality enlargement processing on both binary images and multi-valued images while keeping the cost low.

Although the above description has been given of a case in which the present invention is applied to an OSD device, naturally, it is also possible to apply the present invention to, for example, systems for displaying text regions for personal computers or graphics images such as characters or graphics.

Although a description has been given of an example of a case of the processing for enlarging characters by a vertical magnification factor of 2 and a horizontal magnification factor of 2, the present invention is not limited thereto. For example, it is also possible to enlarge characters by the same magnification factors for both the vertical and horizontal directions, such as a vertical magnification factor of 3 and a horizontal magnification factor of 3 or a vertical magnification factor of 4 and a horizontal magnification factor of 4, or by different magnifications for the vertical and horizontal directions, such as a vertical magnification factor of 2 and a horizontal magnification factor of 1.

As descried above, the series of the processing can be executed by hardware and can also be executed by software. In this case, for example, the image enlarging device 21 is implemented with a personal computer 300 as shown in FIG. 39.

Figure 39:
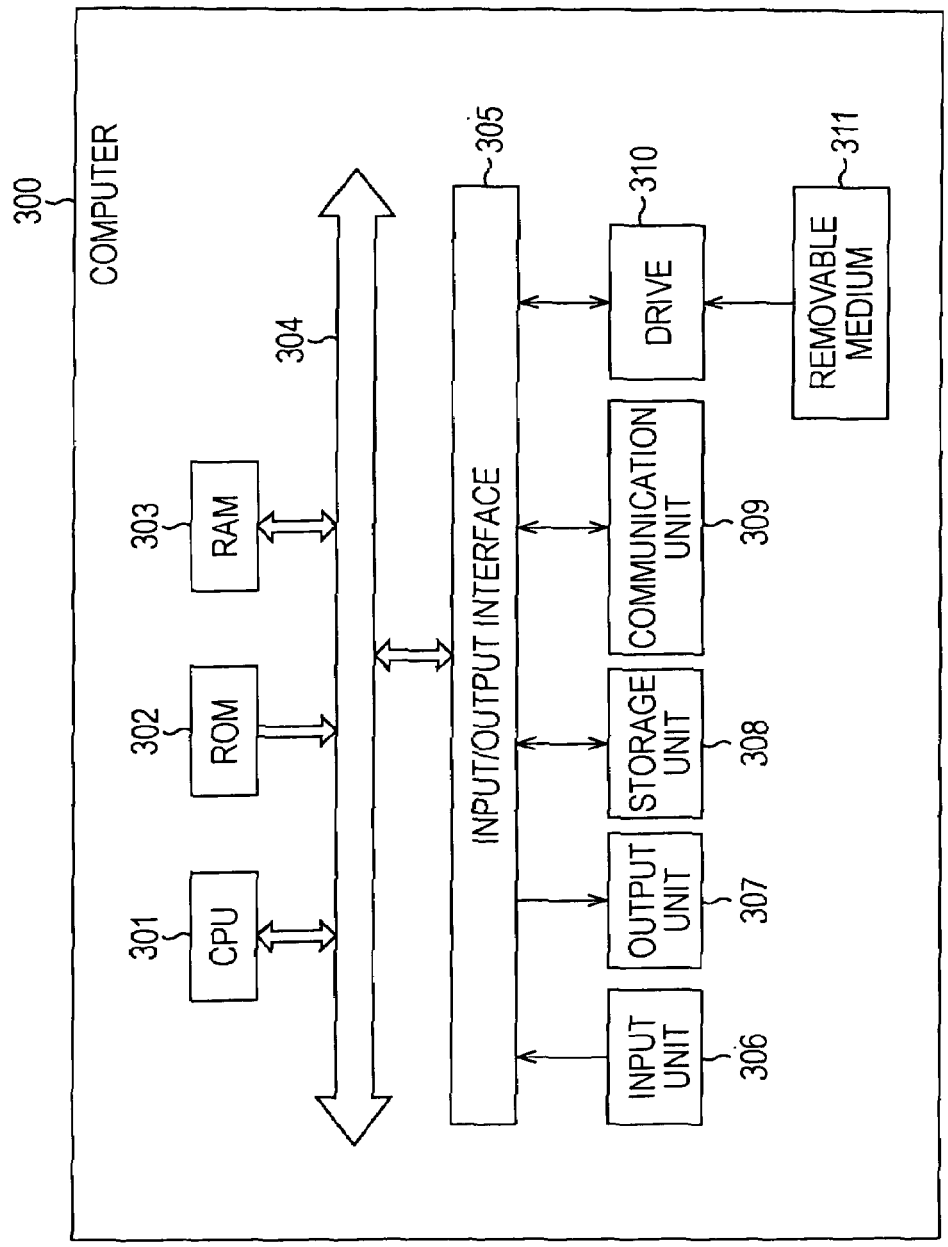
FIG. 39 is a block diagram showing a configuration example of a computer.

In FIG. 39, a CPU (central processing unit) 301 executes various types of processing in accordance with a program stored in a ROM 302 or a program loaded from a storage unit 308 into a RAM (random access memory) 303. As needed, the RAM 303 also stores, for example, data required for the CPU 301 to execute various types of processing.

The CPU 301, the ROM 302, and the RAM 303 are interconnected through a bus 304. An input/output interface 305 is also connected to the bus 304.

An input unit 306 including a keyboard and a mouse, an output section including a display and so on, the storage unit 308, and a communication unit 309 are connected to the input/output interface 305. The communication unit 309 performs communication processing through a network.

A drive 310 is also connected to the input/output interface 305, as needed, and, for example, a removable medium, such as a magnetic disk, an optical disk, a magneto-optical disk, or a semiconductor memory, is attached to the drive 310, as appropriate. A computer program read from the medium 311 is installed on the storage unit 308, as needed.

As shown in FIG. 39, the storage medium for recording the program that is installed on the computer and that is put into an executable state by the computer is not only implemented with the removable medium 311, distributed to provide a user with the program, but also is implemented with, for example, the ROM 303 in which the program is stored or the hard disk included in the storage unit 308, the ROM 303 and the hard disk being supplied to a user in a state pre-incorporated into the main unit of the device. Examples of the removable medium 311 include a magnetic disk (including a flexible disk), an optical disk (including a CD-ROM (compact disk-read only memory) or a DVD (digital versatile disc)), a magneto-optical disk (including an MD (mini-disc) (registered trademark)), or a semiconductor memory in which the program is recorded.

Herein, the steps for describing the program recorded on the storage medium not only include processing that is time-sequentially performed according to the included sequence but also include processing that is concurrently or individually executed without being necessarily time-sequentially processed.

The "system" herein refers to an entire device consisting of a plurality of devices.

The invention claimed is:

1. An information processing device for enlarging an image, comprising:
holding means for holding neighborhood pixels in the image, the neighborhood pixels including a target pixel;
dividing means for dividing the target pixel into of sections;
discriminating means for discriminating between subject color and background color with respect to each pixel held by the holding means,
wherein prior to discriminating between subject color and background color, each of said pixels held by the holding means includes swapped data positions according to position information of each of the plurality of sections of the divided target pixel,
wherein the position information of each of the plurality of sections of the divided target pixel indicates one of the plurality of sections of the divided target pixel;
first-pattern determining means for determining whether or not an arrangement pattern of the subject color and the background color, the arrangement pattern being obtained based on a result of the discrimination performed by the discriminating means, matches a first pattern for expanding the subject color;
second-pattern determining means for determining whether or not an arrangement pattern of the subject color and the background color, the arrangement pattern being obtained based on a result of the discrimination performed by the discriminating means, matches a second pattern for expanding the background color; and
selecting means for selecting data to be fit into each of the plurality of sections of the target pixel, divided by the dividing means, from the neighborhood pixels based on results of the determination performed by the first-pattern and second-pattern determining means.

2. The information processing device according to claim 1, further comprising:
determining means for determining whether or not to change a pixel distribution of the neighborhood pixels including the target pixel, the neighborhood pixels being held by the holding means; and data swapping means for changing the pixel distribution of the neighborhood pixels including the target pixel, based on a result of the determination performed by the determining means.

3. The information processing device according to claim 1, wherein the image is a character, and
each of the first and the second patterns comprises a multi-level pattern determined in accordance with a type of the character.

4. The information processing device according to claim 1, wherein the discriminating means discriminates between the subject color and the foreground color by comparing the target pixel with the neighborhood pixels.

5. An information processing method for an image processing device for enlarging an image, the method comprising:
a holding step of holding neighborhood pixels in the image, the neighborhood pixels including a target pixel;
a dividing step of dividing the target pixel into a plurality of sections;
a discriminating step of discriminating between subject color and background color with respect to each pixel held in the holding step,
wherein prior to discriminating between subject color and background color, each of said pixels held by the holding means includes swapped data positions according to position information of each of the plurality of sections of the divided target pixel
wherein the position information of each of the plurality of sections of the divided target pixel indicates one of the plurality of sections of the divided target pixel;
a first-pattern determining step of determining whether or not an arrangement pattern of the subject color and the background color, the arrangement pattern being obtained based on a discrimination result obtained by the processing performed in the discriminating step, matches a first pattern for expanding the subject color;
a second-pattern determining step of determining whether or not an arrangement pattern of the subject color and the background color, the arrangement pattern being obtained based on a discrimination result obtained in the processing performed by the discriminating step, matches a second pattern for expanding the background color; and
a selecting step of selecting data to be fit into each of the plurality of sections of the target pixel, divided by the processing performed in the dividing step, from the neighborhood pixels based on determination results obtained by the processing performed in the first-pattern and second-pattern determining steps.

6. A storage medium on which a non-transitory computer-readable program for causing a computer to perform image processing for an image processing device for enlarging an image is recorded, the program comprising:
a holding step of holding neighborhood pixels in the image, the neighborhood pixels including a target pixel;
a dividing step of dividing the target pixel into a plurality of sections;
a discriminating step of discriminating between subject color and background color with respect to each pixel held in the holding step,
wherein prior to discriminating between subject color and background color, each of said pixels held by the holding means includes swapped data positions according to position information of each of the plurality of sections of the divided target pixel,
wherein the position information of each of the plurality of sections of the divided target pixel indicates one of the plurality of sections of the divided target pixel;
a first-pattern determining step of determining whether or not an arrangement pattern of the subject color and the background color, the arrangement pattern being obtained based on a discrimination result obtained by the processing performed in the discriminating step, matches a first pattern for expanding the subject color;
a second-pattern determining step of determining whether or not an arrangement pattern of the subject color and the background color, the arrangement pattern being obtained based on a discrimination result obtained in the processing performed by the discriminating step, matches a second pattern for expanding the background color; and
a selecting step of selecting data to be fit into each of the plurality of sections of the target pixel, divided by the processing performed in the dividing step, from the neighborhood pixels based on determination results obtained by the processing performed in the first-pattern and second-pattern determining steps.

7. A non-transitory program for causing a computer to perform image processing for an image processing device for enlarging an image; the program comprising:
a holding step of holding neighborhood pixels in the image, the neighborhood pixels including a target pixel;
a dividing step of dividing the target pixel into a plurality of sections;
a discriminating step of discriminating between subject color and background color with respect to each pixel held in the holding step,
wherein prior to discriminating between subject color and background color, each of said pixels held by the holding means includes swapped data positions according to position information of each of the plurality of sections of the divided target pixel,
wherein the position information of each of the plurality of sections of the divided target pixel indicates one of the plurality of sections of the divided target pixel;
a first-pattern determining step of determining whether or not an arrangement pattern of the subject color and the background color, the arrangement pattern being obtained based on a discrimination result obtained by the processing performed in the discriminating step, matches a first pattern for expanding the subject color;
a second-pattern determining step of determining whether or not an arrangement pattern of the subject color and the background color, the arrangement pattern being obtained based on a discrimination result obtained in the processing performed by the discriminating step, matches a second pattern for expanding the background color; and
a selecting step of selecting data to be fit into each of the plurality of sections of the target pixel, divided by the processing performed in the dividing step, from the neighborhood pixels based on determination results obtained by the processing performed in the first-pattern and second-pattern determining steps.

8. An information processing device for enlarging an image, comprising:
a holding unit for holding neighborhood pixels in the image, the neighborhood pixels including a target pixel;
a dividing unit for dividing the target pixel into a plurality of sections;

a discriminating unit for discriminating between subject color and background color with respect to each pixel held by the holding unit, wherein prior to discriminating between subject color and background color, each of said pixels held by the holding unit includes swapped data positions according to position information of each of the plurality of sections of the divided target pixel, wherein the position information of each of the plurality of sections of the divided target pixel indicates one of the plurality of sections of the divided target pixel;

a first-pattern determining unit for determining whether or not an arrangement pattern of the subject color and the background color, the arrangement pattern being obtained based on a result of the discrimination performed by the discriminating unit, matches a first pattern for expanding the subject color;

a second-pattern determining unit for determining whether or not an arrangement pattern of the subject color and the background color, the arrangement pattern being obtained based on a result of the discrimination performed by the discriminating unit, matches a second pattern for expanding the background color; and a selecting unit for selecting data to be fit into the each of the plurality of sections of target pixel, divided by the dividing unit, from the neighborhood pixels based on results of the determination performed by the first-pattern and second-pattern determining unit.

9. The information processing device according to claim 8, further comprising:
  a determining unit for determining whether or not to change a pixel distribution of the neighborhood pixels including the target pixel, the neighborhood pixels being held by the holding unit; and
  a data swapping unit for changing the pixel distribution of the neighborhood pixels including the target pixel, based on a result of the determination performed by the determining unit.

10. The information processing device according to claim 8, wherein the image is a character, and
  each of the first and the second patterns comprises a multi-level pattern determined in accordance with a type of the character.

11. The information processing device according to claim 8, wherein the discriminating unit discriminates between the subject color and the foreground color by comparing the target pixel with the neighborhood pixels.

* * * * *